US012594544B2

(12) United States Patent
Cattolica et al.

(10) Patent No.: US 12,594,544 B2
(45) Date of Patent: Apr. 7, 2026

(54) HIGH TAR CONVERSION PERFORMANCE OF A Ni—Fe—MgO CATALYST

(71) Applicant: THE REGENTS OF THE UNIVERSITY OF CALIFORNIA, Oakland, CA (US)

(72) Inventors: Robert Cattolica, San Diego, CA (US); Tinku Baidya, San Diego, CA (US)

(73) Assignee: The Regents at the University of California, Oakland, CA (US)

( * ) Notice: Subject to any disclaimer, the term of this patent is extended or adjusted under 35 U.S.C. 154(b) by 390 days.

(21) Appl. No.: 16/347,145

(22) PCT Filed: Nov. 16, 2017

(86) PCT No.: PCT/US2017/062062
§ 371 (c)(1),
(2) Date: May 2, 2019

(87) PCT Pub. No.: WO2018/094078
PCT Pub. Date: May 24, 2018

(65) Prior Publication Data
US 2020/0055030 A1 Feb. 20, 2020

Related U.S. Application Data

(60) Provisional application No. 62/423,283, filed on Nov. 17, 2016.

(51) Int. Cl.
| | |
|---|---|
| *B01J 23/78* | (2006.01) |
| *B01J 23/00* | (2006.01) |
| *B01J 37/04* | (2006.01) |
| *B01J 37/08* | (2006.01) |

(52) U.S. Cl.
CPC ............ *B01J 23/78* (2013.01); *B01J 23/002* (2013.01); *B01J 37/04* (2013.01); *B01J 37/088* (2013.01); *C01B 2203/1058* (2013.01); *C01B 2203/1082* (2013.01)

(58) Field of Classification Search
CPC ... Y02P 20/52; C01B 3/40; C01B 2203/1047; C01B 2203/1052; C01B 2203/1058; C01B 3/326; B01J 23/755; B01J 2523/22; B01J 2523/842; B01J 2523/847
See application file for complete search history.

(56) References Cited

U.S. PATENT DOCUMENTS

| | | | | |
|---|---|---|---|---|
| 3,791,993 | A | 2/1974 | Rostrup | |
| 3,931,053 | A | 1/1976 | Kazakov et al. | |
| 4,585,752 | A | 4/1986 | Ernest | |
| 4,880,764 | A | 11/1989 | Imai et al. | |
| 5,986,127 | A * | 11/1999 | Ionkin ................... | C07C 253/30 |
| | | | | 558/459 |
| 6,402,989 | B1 | 6/2002 | Gaffney | |

(Continued)

OTHER PUBLICATIONS

A Preliminary Roadmap for the Development of Biomass in California. California Energy Commission Report CEC-500-2006-095-D, Dec. 2006.

(Continued)

*Primary Examiner* — Imran Akram
(74) *Attorney, Agent, or Firm* — FisherBroyles, LLP

(57) ABSTRACT

Disclosed herein, inter alia, are novel nickel-iron-magnesium oxide catalyst compositions and methods of making and using the same.

23 Claims, 11 Drawing Sheets

(56) References Cited

U.S. PATENT DOCUMENTS

| | | | | |
|---|---|---|---|---|
| 6,417,419 B1 * | 7/2002 | Abrevaya | ............... | C07C 7/167 |
| | | | | 585/258 |
| 7,915,196 B2 | 3/2011 | Parent et al. | | |
| 9,067,198 B2 | 6/2015 | Pak | | |
| 9,498,769 B2 | 11/2016 | Son et al. | | |
| 2002/0037938 A1 | 3/2002 | Luo et al. | | |
| 2010/0150823 A1 | 6/2010 | Huang et al. | | |
| 2011/0062387 A1 | 3/2011 | Anfang et al. | | |
| 2012/0079768 A1 | 4/2012 | Kiennemann et al. | | |
| 2014/0134099 A1 * | 5/2014 | Paul | ........................ | C01B 3/323 |
| | | | | 423/648.1 |
| 2014/0148332 A1 * | 5/2014 | Moon | .................. | B01J 23/8872 |
| | | | | 502/306 |
| 2019/0016594 A1 * | 1/2019 | Singh | ........................ | C01B 3/34 |

OTHER PUBLICATIONS

Abu El-Rub, Z. et al., "Review of Catalysts for Tar Elimination in Biomass Gasification Processes," *Ind. Eng. Chem. Res.* 2004, 43, 6911-6919.

Anis, S. et al., "Tar reduction in biomass producer gas via mechanical, catalytic and thermal methods: A review," Renewable and Sustainable Energy Reviews 15 (2011) 2355-2377.

Ashok, J. "Bi-functional hydrotalcite-deirved NiO—CaO—Al2O3 catalysts for steam reforming of biomass and/or tar model compound at low steam-to-carbon conditions," Appl. Catal. B: Environ 172-173 (2015) 116-128.

Ashok, J. et al., "Nickel-Iron Alloy Supported over Iron-Alumina catalysts for Steam reforming of Biomass Tar Model Compound," ACS Catal. 4 (2014) 289-301.

Ashok, J. et al., "Steam reforming of biomass tar model compound at relatively low steam-to-carbon condition over CaO-doped nickel-iron alloy supported over iron-alumina crystals," Appl. Catal. A: Gen. 490 (2015) 24-35.

Ashok, J. et al., "Steam reforming of toluene as a biomass tar model compound over CeO2 promoted Ni/CaO-Al2O3 catalytic systems," Int J. Hydrogen Energy 38 (2013) 13938-13949.

Baidya, T. et al., "Fe and CaO promoted Ni Catalyst on gasifier bed material for tar removal from producer gas," Appl. Catal A: Gen. 503 (2015) 43-50.

Baidya, T. et al., "Improved catalytic performance of CaO and CeO2 promoted Ni catalyst on gasifier bed material for tar removal from producer gas," Appl. Catal A: Gen. 498 (2015) 150-158.

Bambal, A. et al., "Catalytic Effect of Ni and Fe Addition to Gasifier Bed Material in the Steam Reforming of Producer Gas," Ind. Eng. Chem. Res. 53, 35, (2014) 13656-13666.

Bimbela, F. et al., "Ni/Al coprecipitated catalysts modified with magnesium and copper for the catalytic steam reforming of model compounds from biomass pyrolysis liquids," Appl. Catal. B: Environ. 119-120 (2012) 1-12.

California Code of Regulations, Distributed Generation Certification Program, Amendments to the Distributed Generation Certification, sections 94200-94214, in article 3, subchapter 8, chapter 1, division 3 of title 17.

Corella, J. et al., "Catalytic Hot Gas Cleaning with Monoliths in Biomass Gasification in Fluidized Beds. 2. Modeling of the Monolithic Reactor," *Ind. Eng. Chem. Res.* 2004, 43, 8207-8216.

Corella, J. et al., "Olivine or Dolomite as In-Bed Additive in Biomass Gasification with Air in a Fluidized Bed: Which is Better?," Energy Fuels 18 (2004) 713-720.

Dayton, D., "A review of the literature on catalytic biomass tar destruction," NREL Report/TP-510-32815, Dec. 2002.

De Lasa, H. et al., "Catalytic Steam Gasification of Biomass: Cataysts, Thermodynamics and Kinetics," Chem. Rev. 2011, 111, 5404-5433.

Devi, L. et al., "A review of the primary measures for tar elimination in biomass gasification processes," Biomass Bioenergy 24 (2003) 125-140.

Devi, L. et al., "Catalytic decomposition of biomass tars: use of dolomite and untreated olivine," Renew. Energy 30 (2005) 565-587.

Di Felice, L. et al., "Iron and nickel doped alkaline-earth catalysts for biomass gasification with simultaneous tar reformation and CO2 capture," Int J. Hydrogen Energy 36 (2011) 5296-5310.

Djaidja, A. et al., "Effect of Fe or Cu addition on Ni/Mg-Al and Ni/MgO catalysts in the steam-reforming of methane," Stud. Surf. Sci. Catal. 162 (2006) 945-952.

Dong, X. et al., "Effect of Transition Metals (Cu, Co and Fe) on the Autothermal Reforming of Methane over Ni/Ce0.2Zr0.1Al0.7O? Catalyst," J. Nat. Gas Chem. 16 (2007) 31-36.

Geber, M. A. "Report: Review of Novel Catalysts for BiomassTar Cracking and Methane Reforming," PNNL 2007 (22 pages).

Ishida, M. et al., "Application of Fe2O3—Al2O3 Composite Particles as Solid Looping Material of the chemical-Loop Combustor," Energy Fuels 19 (2005), 2514-2518.

Kimura, T. et al., "Development of Ni catalysts for tar removal by steam gasification of biomass," Appl. Catal. B: Environ. 68 (2006) 160 170.

Koike, M. et al., "A highly active and coke-resistant steam reforming catalyst comprising uniform nickel-iron allow nanparticles," ChemSusChem 5 (2012) 2312-2314.

Koppatz, S. et al., "Comparison of the performance behaviour of silica sand and olivine in a dual fluidised bed reactor system for steam gasification of biomass at pilot plant scale," Chem. Eng. J. 175 (2011) 468-483.

Kumar, A. et al., "Thermochemical Biomass Gasification: A Review of the Current Status of the Technology," Energies 2009, 2, (3), 556-581.

Li, C. et al., "Development of new nickel based catalyst for biomass tar steam reforming productin H2-rich syngas," Fuel Process. Technol. 90 (2009) 790-796.

Li, D. et al., "Metal catalysts for steam reforming of tar derived from the gasification of lignocellulosic biomass," Bioresource Technol. 178 (2015) 53-64.

Li, D. et al., "Regenerability of hydrotalcite-derived nickel-iron alloy nanoparticles for syngas production from biomass tar," ChemSusChem, 7 (2014) 510-522.

Magrini-Bair, K. A. et al., "Bench- and Piolot-Scale Studies of Reaction and Regeneration of Ni—Mg—K/Al2O3 for Catalytic conditioning of Biomass-Derived Syngas," Top. Catal. 55 (2012) 209-217. (ref cat).

Maluf, S. S. et al., "Ni catalysts with Mo promotor for methane steam reforming," Fuel 88 (2009) 1547-1553.

Miccio, F. et al., "Biomass gasification in a catalytic fluidized reactor with beds of different materials," Chem. Eng. J. 154 (2009) 369-374.

Nishikawa, J. et al., "Promoting effect of Pt addition to Ni/CeO2/Al2O3 catalyst for steam gasification of biomass," Catal. Commun. 9 (2008) 195-201.

Olivares, A. et al., "Biomass Gasification: Produced Gas Upgrading by In-Bed Use of Dolomite," Ind. Eng. Chem. Res. 36 (1997) 5220-5226.

Pfeifer, C. et al., "Steam gasification of various feedstocks at a dual fluidised bed gasifier: Impacts of operation conditions and bed materials," Biomass Conv. Bioref. 1 (2011) 39-53.

Phillips, S. et al., "Thermochemical Ethanol via Indirect Gasification and Mixed Alcohol Synthesis of Lignocellulosic Biomass," Technical Report, U.S. National Renewal Energy Laboratory, NREL/TP-510-41168, Apr. 2007.

Rapagna, S. et al., "Steam-gasification of biomass in a fluidised-bed of olivine particles," Biomass Bioenergy 19 (2000) 187-197.

Simell, P.A. et al., "Effects of gasification gas components on tar and ammonia decomposition over hot gas cleanup catalysts," Fuel 76 (1997) 1117-1127.

Swierczynski, D. et al., "Characterization of Ni-Fe/MgO/Olivine Catalyst for Fluidized Bed Steam Gasification of Biomass," Chem. Mater. 18, (2006) 4025-4032.

Swierczynski, D. et al., "Study of steam reforming of toluene used as model compound of tar produced by biomass gasification," Chemical Engineering and Processing: Process Intensification 47 (2008) 508-513.

(56) References Cited

OTHER PUBLICATIONS

Tittmann, P., "The wood in the forest: Why California needs to reexamine the role of biomass in climate policy," California Agriculture, Jul. 2015, vol. 69, (3), 133-137.

Wang, L., et al., "Catalytic performance and characterization of Ni—Co catalysts for the steam reforming of biomass tar to synthesis gas," Fuel 112 (2013) 654-661.

Wang, L. et al., "Catalytic performance and characterization of Ni—Fe Catalysts for the steam reforming of tar from biomass pyrolysis to synthesis gas," Appl. Catal. A: Gen. 392 (2011) 248-255.

Zhang, R. et al., "Catalytic reforming of toluene as tar model compound: Effect of Ce and Ce—Mg promoter using Ni/olivine catalyst," Chemosphere 97 (2014) 40-46.

Zhang, R. et al., "Steam reforming of tar compounds over Ni/olivine catalysts doped with CeO2," Energy Convers. Manage. 48 (2007) 68-77.

* cited by examiner

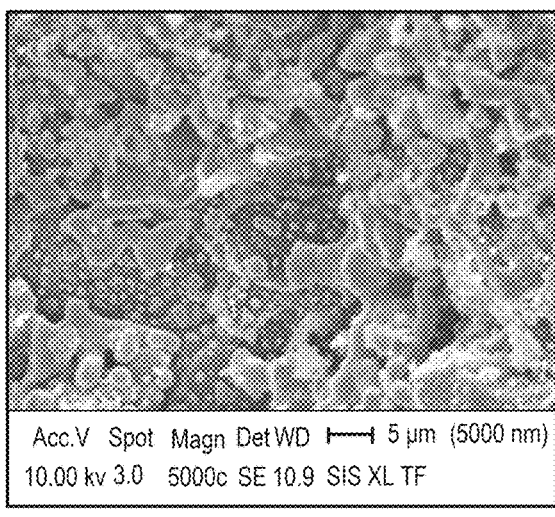
FIG. 10A
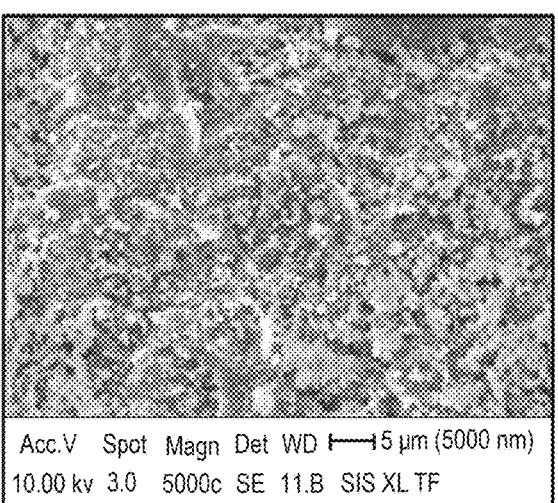
FIG. 10B
FIG. 10C
FIG. 10D

HIGH TAR CONVERSION PERFORMANCE OF A Ni—Fe—MgO CATALYST

CROSS-REFERENCES TO RELATED APPLICATIONS

This application claims the benefit of U.S. Provisional Application No. 62/423,283, filed Nov. 17, 2016, which is incorporated herein by reference in its entirety and for all purposes.

BACKGROUND

Biomass is organic matter derived from living, or recently living organisms. Biomass can be used as an energy source either directly via combustion to produce heat, or indirectly after converting it to various forms of biofuel. Gasification is a process that converts organic or fossil fuel based carbonaceous materials into carbon monoxide, hydrogen, and carbon. This is achieved by reacting the material at high temperatures (>700° C.), without combustion, with a controlled amount of oxygen and/or steam. The resulting gas mixture is called syngas (or synthesis gas or synthetic gas) or producer gas and is itself a fuel. The resultant gas is considered to be a source of renewable energy if the gasified compounds were obtained from biomass. The tar components found in syngas consist of a mixture of hydrocarbons (e.g., aromatic hydrocarbons) which are condensable at room temperatures. The tars components need to be removed from the producer gas before it enters any downstream processes, as the tars can cause severe fouling and corrosion problems. Disclosed herein, inter alia, are solutions to these and other problems in the art.

BRIEF SUMMARY OF THE INVENTION

In an aspect is provided a catalyst comprising nickel (Ni), iron (Fe), and magnesium oxide (MgO), wherein the catalyst includes 30 to 60 wt % Ni, 10 to 30 wt % Fe, and 20 to 50 wt % MgO.

In an aspect is provided a method of making a nickel-iron-magnesium oxide catalyst, the method including: (a) mixing nickel nitrate, iron nitrate, and magnesium nitrate in a solvent; (b) combining the solution of step (a) with a substrate support to form a mixture; (c) maintaining the mixture of step (b) at a first temperature ($T_1$) for a first duration of time ($t_1$); (d) increasing the temperature of the mixture in step (c) to a second temperature ($T_2$) and maintaining $T_2$ for a second duration of time ($t_2$), wherein the increasing of the temperature is performed at a first rate of increase ($R_1$); and (e) calcining the mixture of step (d) by increasing the temperature of the mixture of step (d) to a third temperature ($T_3$) and maintaining $T_3$ for a third duration of time ($t_3$), wherein the increasing of the temperature is performed at a second rate of increase ($R_2$).

In an aspect is provided a method of reducing tar from a gas mixture, the method comprising contacting a catalyst as described herein, including embodiments, with the gas mixture at an operating temperature from about 500° C. to about 1000° C.

BRIEF DESCRIPTION OF THE DRAWINGS

FIGS. 10A-10D. SEM images of freshly reduced samples of (FIG. 10A) 0.75% Ni, (FIG. 10B) 1.15% (Ni67Fe33), (FIG. 10C) 1.15% (Ni45Fe20Mg35), and (FIG. 10D) spent 1.15% (Ni45Fe20Mg35).

FIG. 12A illustrates a catalyst deactivation and regeneration sequence on 15% (Ni45Fe20Mg35)/Al₂O₃ and 14.92% (Ni41Mg27K32)/Al₂O₃ catalysts in the presence of H2S. FIG. 12B illustrates the catalyst regeneration ability of the poisoned 15% (Ni45Fe20Mg35)/Al₂O₃ and 14.92% (Ni41Mg27K32)/Al₂O₃ catalysts as a function of time.

DETAILED DESCRIPTION

Figures 1, 2:
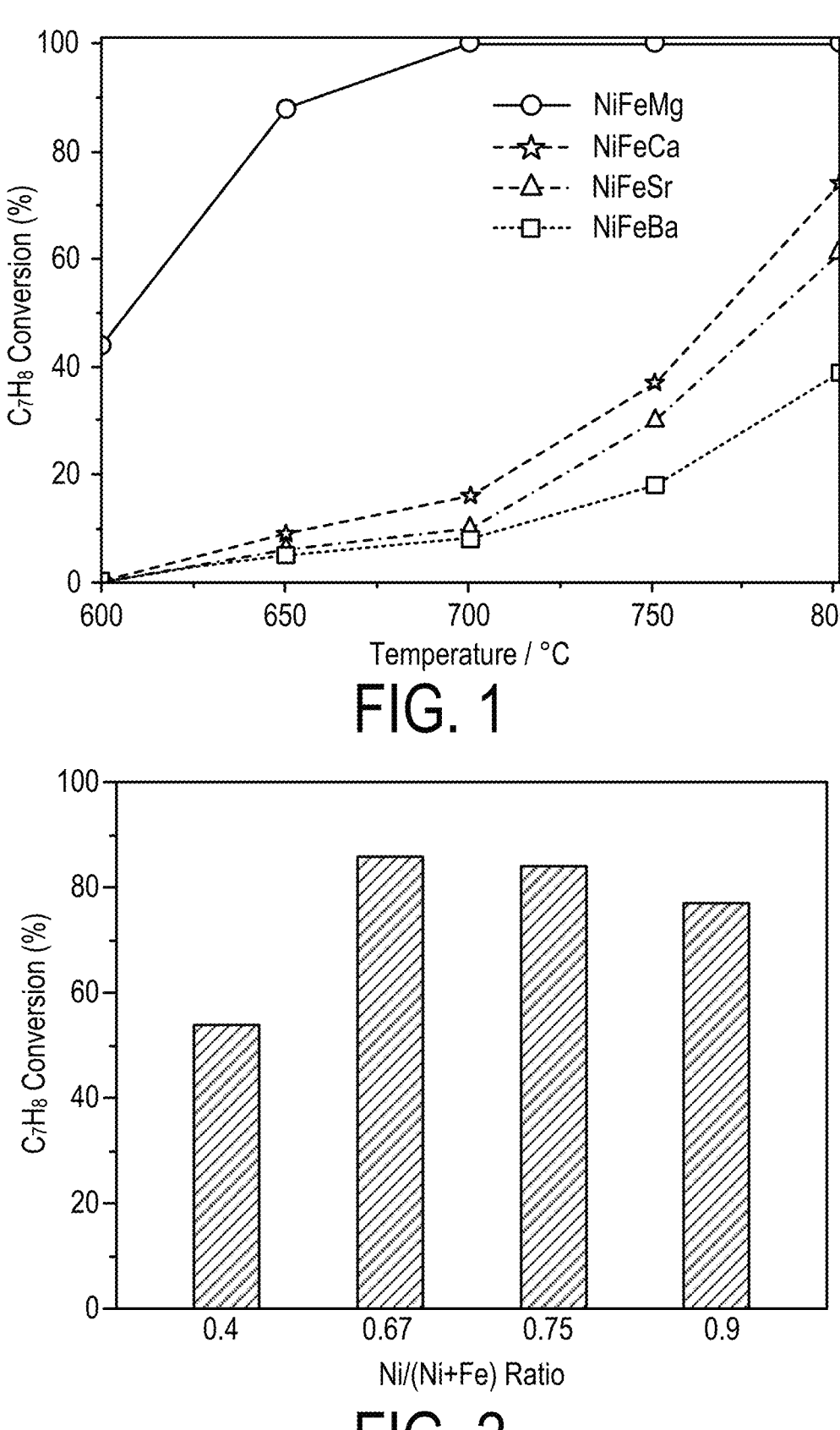
FIG. 1. Comparison of toluene conversion activity over X wt % MO+0.75 wt % (Ni67Fe33) (MO=MgO, CaO, SrO, BaO; X is equimolar to 0.4 wt % MgO) catalysts containing various alkaline earth metal oxides over a range of temperatures, 600-800° C. (GHSV=12990 cc $g^{-1}h^{-1}$).
FIG. 2. Optimization of toluene conversion activity with varying Ni/(Ni+Fe) ratios in 0.4 wt % MgO+0.75 wt % NiFe catalysts, in which total weight of NiFe was constant 0.75 wt % (GHSV=12990 cc $g^{-1}h^{-1}$; Temperature—650° C.).
Figure 3A:
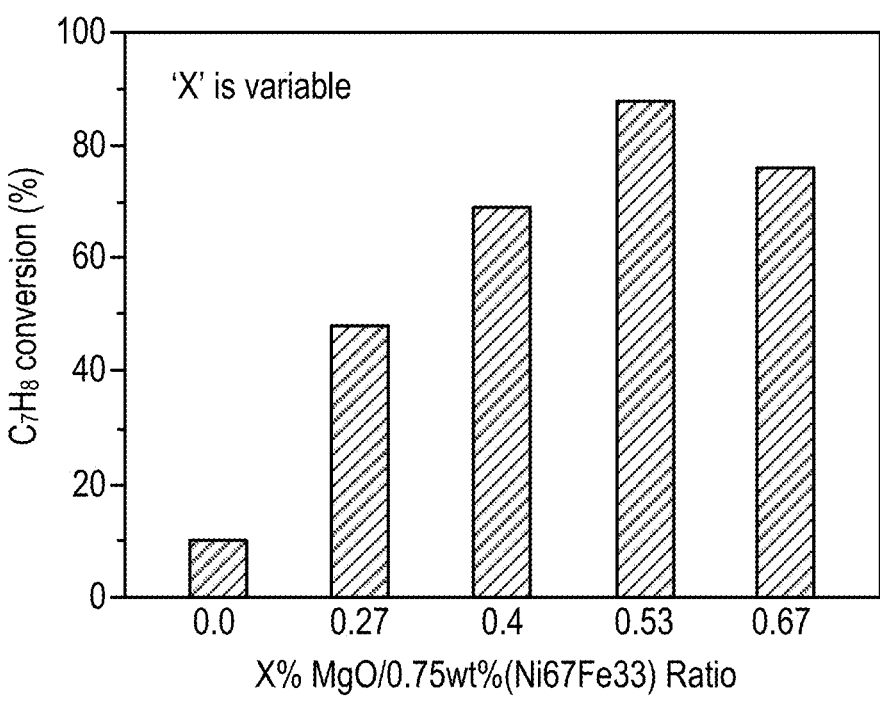
FIGS. 3A-3B. Optimization of toluene conversion activity with variation in MgO content in (FIG. 3A) Ni—Fe—MgO and (FIG. 3B) Ni—MgO catalysts, in which 0.75 wt % (Ni67Fe33) and 0.75 wt % Ni are constant, respectively (GHSV=12990 cc $g^{-1}h^{-1}$; Temperature—650° C.).
Figure 3B:
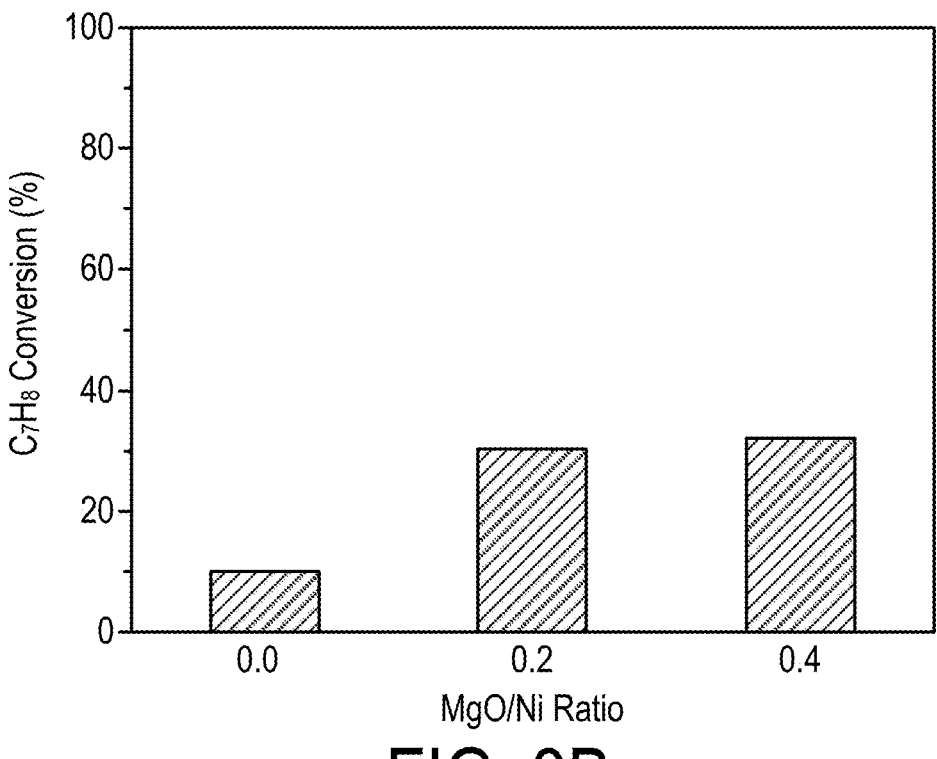
Figures 4, 5:
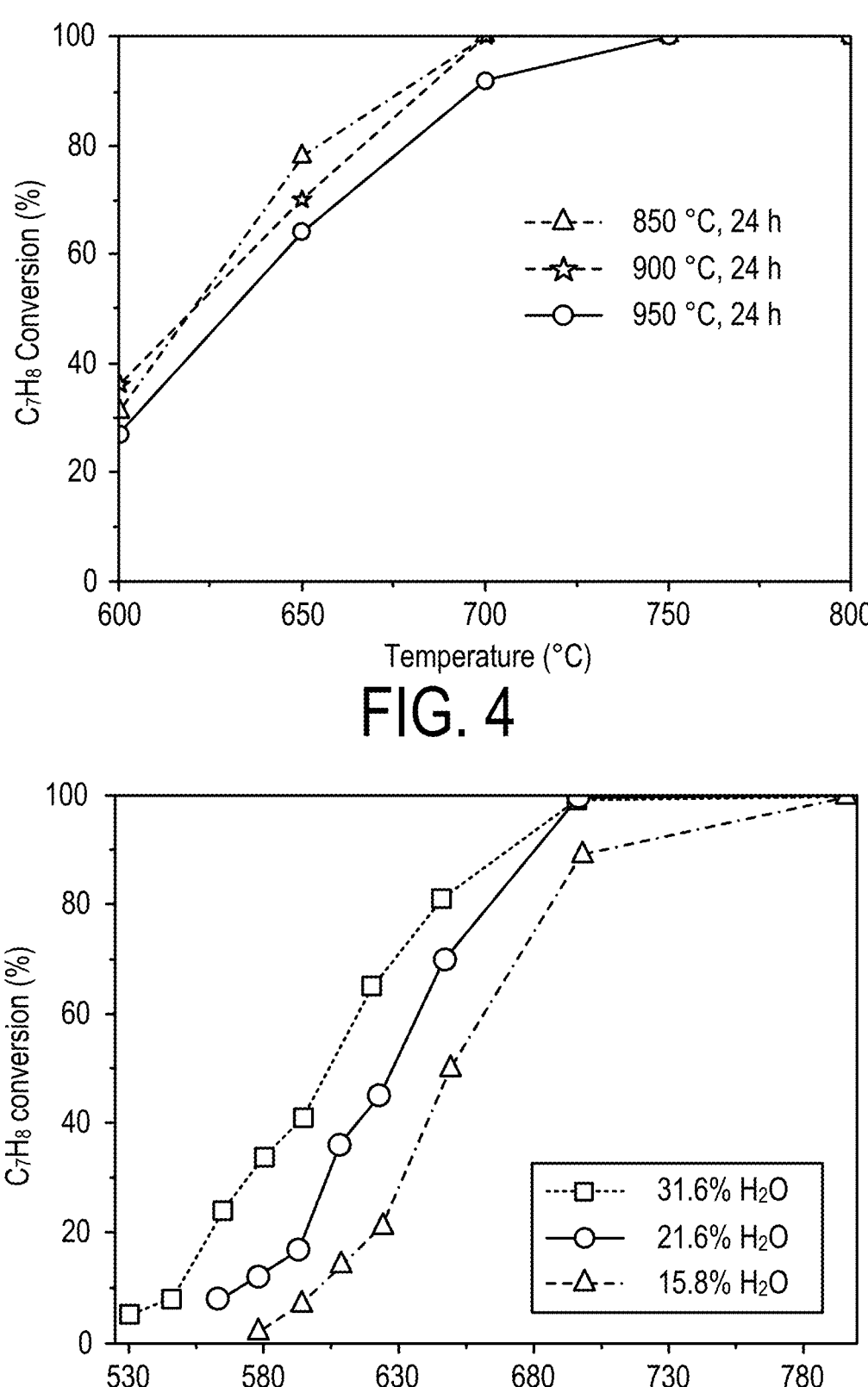
FIG. 4. Effect of calcination temperatures on 1.15% (Ni45Fe20Mg35)/Carbo HSP catalyst for the toluene conversion activity (GHSV=12990 cc $g^{-1}h^{-1}$; Time of calcination—15 hrs).
FIG. 5. Toluene conversion vs $H_2O$ concentration in producer gas over 1.15% (Ni45Fe20Mg35)/Carbo HSP catalyst (GHSV=12990 cc $g^{-1}h^{-1}$).
Figure 6:
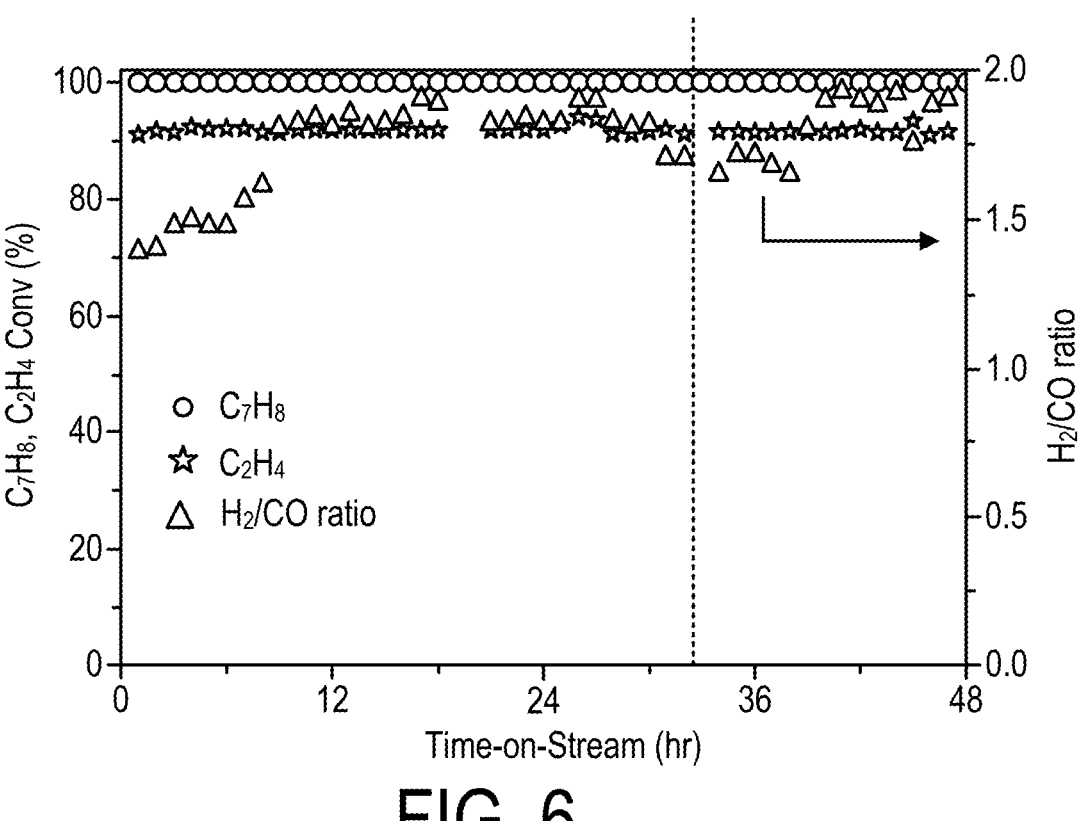
FIG. 6. Time-on-Stream study over 1.15% (Ni45Fe20Mg35)/Carbo HSP catalyst with producer gas (GHSV=12990 cc $g^{-1}h^{-1}$; Temperature—750° C.).
Figure 7A:
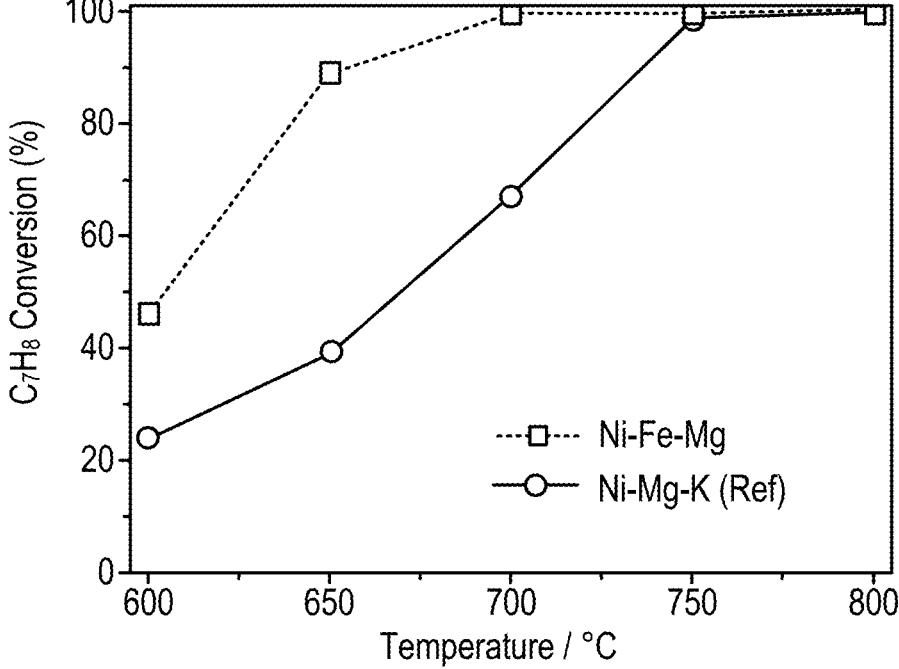
FIGS. 7A-7B. The comparison of (FIG. 7A) toluene and (FIG. 7B) benzene conversion activity between 1.15% (Ni45Fe20Mg35)/Carbo HSP and the reference catalysts 1.15% (Ni41Mg27K32)/Carbo HSP over a range of temperatures in separate experiments.
Figure 7B:
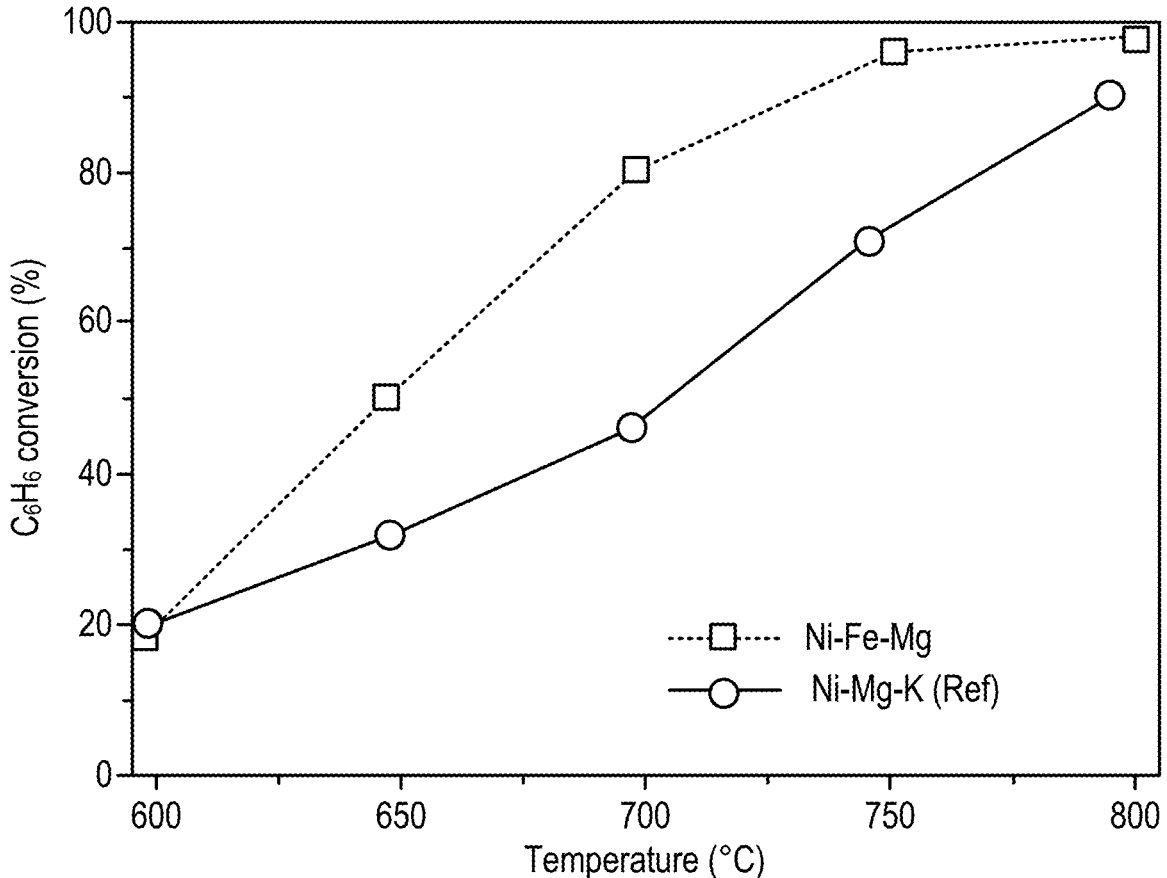

Disclosed herein are novel and advantageous methods and systems for cleaning condensable hydrocarbons (e.g., tars such as benzene, toluene, and naphthalene) that are included in producer gas obtained from biomass gasification. In embodiments, one way to remove tars is to perform steam reforming on a catalyst, decomposing those into COx and H₂.

Disclosed herein is a catalyst for use in reforming tar in producer gas from biomass gasification. In an exemplary embodiment, the catalyst includes a Ni—Fe—MgO mixture with optimization of the components on a sintered bauxite support, a non-porous commercially available synthetic mineral that includes, for example, a mixture of $Al_2O_3$ (83%), $SiO_2$ (5%), $TiO_2$ (3.5%), $Fe_2O_3$ (7%), reaching an optimum composition with the highest activity for tar decomposition via steam reforming of producer gas containing toluene as tar component. Other compatible support can include aluminum ore, aluminum oxide, or other similar materials.

A Ni-based mixed oxide material (Ni—Fe—MgO) for catalyzing an exemplary gasifier bed material is described and characterized by XRD, TPR, TEM and SEM techniques. The catalyst performance for tar removal from a simulated producer gas mixture via steam reforming was evaluated in a laboratory-scale fixed-bed reactor using toluene and ethylene as tar surrogates. In some implementations, the optimized catalyst composition contained Ni:Fe:MgO in the ratio of 45:20:35 by weight. The catalyst activity was much superior as compared to the CaO, SrO and BaO analogs as well as reference Ni:K:MgO catalyst in the temperature range between 600 and 800° C. Time on stream over the 1.15% (Ni45Fe20Mg35) catalyst showed unabated tar (toluene+ethylene) conversion of 100% at 750° C. for at least 50 hrs. The enhanced performance with MgO can be attributed to the strong adsorption of $H_2O$ on oxide ion vacancy site of MgO acting as oxygen buffer site.

I. Definitions

The term "exemplary" is used to mean serving as an example, instance, or illustration. Any embodiment or design described herein as "exemplary" is not necessarily to be construed as preferred or advantageous over other embodiments or systems. Rather, use of the word exemplary is intended to present concepts in a concrete manner.

As used herein, the term "about" means a range of values including the specified value, which a person of ordinary skill in the art would consider reasonably similar to the specified value. In embodiments, about means within a standard deviation using measurements generally acceptable in the art. In embodiments, about means a range extending to +/−10% of the specified value. In embodiments, about means the specified value.

As defined herein, the term "reducing" and the like in reference to a method of reducing tar from a gas mixture means negatively affecting (e.g. decreasing) the level of tar of the gas mixture relative to the level of tar in the absence of the method.

The term "honeycomb" and "honeycomb structure" refers to a substrate support comprising a plurality of interconnected cell walls that define a plurality of cells (e.g., a lattice of cells). Typically many honeycomb core materials define hexagonal cells, the scope of the present disclosure encompasses substrate support that define cells of other shapes, such as square, rectangular, and the like.

The term "catalyst" is used in accordance with its plain ordinary meaning and refers to a substance that modulates (e.g., increases the rate of a chemical reaction relative to the absence of the catalyst) the rate of a chemical reaction without being consumed in the reaction. In embodiments, the catalyst is a tar steam reforming catalyst.

The term "substrate support" as used herein refers to a material (e.g., a solid material) to which a catalyst is affixed and/or incorporated. In embodiments the catalyst is covalently bound to the substrate support. Typically substrate supports have high surface area and are inert in the catalytic reactions. A substrate support may be a particle (e.g., nanoparticle or microparticle). In embodiments, the substrate support is ceramic. Non-limiting examples of substrate supports are comprised of ceramic, olivine, dolomite, calcium carbonate, aluminum oxide, silicon dioxide, titanium dioxide, and iron oxide. In embodiments, the substrate support comprises aluminum oxide, silicon dioxide, titanium dioxide, and iron oxide (e.g., Carbo HSP). In embodiments, the substrate support is sintered bauxite. In embodiments, the substrate support is cordierite.

A "nanoparticle," as used herein, is a particle wherein the longest diameter is less than or equal to 1000 nanometers. Nanoparticles may be composed of any appropriate material. For example, nanoparticle cores may include appropriate metals and metal oxides thereof (e.g., a metal nanoparticle core), carbon (e.g., an organic nanoparticle core) silicon and oxides thereof (e.g., a silicon nanoparticle core) or boron and oxides thereof (e.g., a boron nanoparticle core), or mixtures thereof. The nanoparticle may be a metal nanoparticle. When the nanoparticle is a metal, the metal may be titanium, zirconium, gold, silver, platinum, cerium, arsenic, iron, aluminum or silicon. The metal nanoparticle may be titanium, zirconium, gold, silver, or platinum and appropriate metal oxides thereof. In embodiments, the nanoparticle is titanium oxide, zirconium oxide, cerium oxide, arsenic oxide, iron oxide, aluminum oxide, or silicon oxide.

A "microparticle," as used herein, is a particle wherein the longest diameter is less than or equal to 1000 micrometers, and greater than 1000 nanometers. Microparticles may be composed of any appropriate material. For example, microparticle cores may include appropriate metals and metal oxides thereof (e.g., a metal microparticle core), carbon (e.g., an organic microparticle core) silicon and oxides thereof (e.g., a silicon microparticle core) or boron and oxides thereof (e.g., a boron microparticle core), or mixtures thereof. The microparticle may be a metal microparticle. When the microparticle is a metal, the metal may be titanium, zirconium, gold, silver, platinum, cerium, arsenic, iron, aluminum or silicon. The metal microparticle may be titanium, zirconium, gold, silver, or platinum and appropriate metal oxides thereof. In embodiments, the microparticle is titanium oxide, zirconium oxide, cerium oxide, arsenic oxide, iron oxide, aluminum oxide, or silicon oxide.

The term "tar" and "condensable hydrocarbons" are used synonymously and are used in accordance with their plain ordinary meaning in the art and refers to organic compounds with a molecular mass greater than benzene which condense on metal surfaces at room temperature. Tar is formed during gasification, the exact composition of which depends on the reaction conditions. For example, burning biomass at the temperature 400° C. results in higher oxygenate species (e.g., alcohols such as methanol, ethanol, propyl alcohol and butanol; and ethers (e.g., methyl tert-butyl ether (MTBE), tert-amyl methyl ether (TAME), tert-hexyl methyl ether (THEME), ethyl tert-butyl ether (ETBE), tert-amyl ethyl ether (TAEE), and diisopropyl ether (DIPE)). When the temperature is increased to 500° C. phenolic ethers become are formed, 600° C. alkyl phenolic compounds, 700° C. heterocyclic ethers, and <900° C. results in the formation of polycyclic aromatic hydrocarbons. Non-limiting examples of tar includes hydrocarbon acids (e.g., formic acid, acetic acid, propionic acid, or butyric acid), sugars (e.g., levoglucosan, glucose, fructose, or cellobiosan), alcohols (e.g., methanol, ethanol, or propanol), aldehydes (e.g., acetaldehyde), ketones (e.g., acetone, 2-cyclopenten-1-one), phenols (e.g., phenol, cresol, xylenol, butylphenol, methylbutylphenol, naphthol, e.g., methylnaphthol), guaiacols (e.g., guaiacol, creosol, ethylguaiacol, eugenol, or isoeugenol), furans (e.g., dimethylfuran, furfural, or dibenzofuran), benzene, toluene, xylene, styrene, indene, methlindene, polycyclic aromatic hydrocarbons (e.g., naphthalene, diphenyl, acenaphthylene, acenaphthene, fluorine, phenanthrene, anthracene, fluoranthene, pyrene, benzo(a)anthracene, chrysene, benzo(b, j, or k)fluoranthene, benzo(a or e)pyrene, dibenzo(a,h)anthracene, perylene, indeno(1,2,3-cd)pyrene, benzo(g, h,i)perylene, dibenzopyrenes, anthanthrene, or coronene), pyridine, picoline, or quinolone. In embodiments tar includes compounds identified in the technical report titled "Sampling and Analysis of Tar and Particles in Biomass Producer Gases" available online at http://www.tarweb.net/results/pdf/Technical-Report-version-3_8-final.pdf, retrieved Sep. 29, 2017, which is incorporated herein by reference in its entirety for all purposes.

As used herein, the term "about" means a range of values including the specified value, which a person of ordinary skill in the art would consider reasonably similar to the specified value. In embodiments, about means within a standard deviation using measurements generally acceptable in the art. In embodiments, about means a range extending to +/−10% of the specified value. In embodiments, about includes the specified value.

"Contacting" is used in accordance with its plain ordinary meaning and refers to the process of allowing at least two distinct species (e.g. chemical compounds including biomolecules or cells) to become sufficiently proximal to react, interact or physically touch. It should be appreciated; however, the resulting reaction product can be produced directly from a reaction between the added reagents or from an intermediate from one or more of the added reagents that can be produced in the reaction mixture. The term "contacting" may include allowing two species to react, interact, or physically touch, wherein the two species may be a compound as described herein and a catalyst or substrate support.

It is understood that the weight percent (i.e. wt %) of the catalyst should be equal to 100% when summing the % wt of the individual components, i.e. nickel, iron, and magnesium dioxide. In embodiments, the wt % is calculated as the sum of the individual components, i.e. nickel, iron, and magnesium dioxide. In embodiments the wt % does not include the substrate support.

II. Compositions

In an aspect is provided a catalyst including nickel (Ni), iron (Fe), and magnesium oxide (MgO), wherein the catalyst includes about 30 to 60 wt % Ni, about 10 to 30 wt % Fe, and about 20 to 50 wt % MgO. In embodiments, catalyst includes 30 to 60 wt % Ni, 10 to 30 wt % Fe, and 20 to 50 wt % MgO.

Disclosed herein is a catalyst for use in reforming tar in producer gas from biomass gasification. In an exemplary embodiment, the catalyst includes a Ni—Fe—MgO mixture with optimization of the components on a sintered bauxite support, a non-porous commercially available synthetic mineral that includes, for example, a mixture of $Al_2O_3$ (83%), $SiO_2$ (5%), $TiO_2$ (3.5%), $Fe_2O_3$ (7%), reaching an optimum composition with the highest activity for tar decomposition via steam reforming of producer gas containing toluene as tar component. Other compatible support can include aluminum ore, aluminum oxide, or other similar materials.

The exemplary catalyst is intended to decompose tar components in producer gas. The incorporation of the components like Fe and MgO into Ni was intended due to following reasons. Ni metal has the ability to dissociate C—C bonds of hydrocarbons, but pure Ni accumulates coke species on the surface easily and gets deactivated fast. Thus, Fe was added to form an alloy, as characterized by $FeNi_3$ phase. Since Fe has mildly redox nature, more oxygen species is available on the alloy surface in the presence of $H_2O$. Thus, carbon species formed on $FeNi_3$ surface can react with oxygen species minimizing the process of deactivation. In the as-prepared calcined samples, NiO and MgO form solid solution easily, thus, when reduction pretreatment is carried out before the reaction, Ni metal comes out of the solid solution and forms a highly dispersed active phase. Moreover, MgO contains oxide defects which act as $H_2O$ adsorption site.

In an exemplary embodiment, a method of preparing a Ni—Fe—MgO based catalyst is disclosed where the method comprises creating a solution by dissolving in a solvent calculated quantities of precursors including Ni(NO3)2.6H2O, Fe(NO3)3.9H2O, and Mg(NO3)2.6H2O; creating a mixture by applying the solution to a substrate; maintaining the mixture at a first temperature for a first duration of time; raising and maintaining temperature of the mixture to a second temperature for a second duration of time, wherein the raising of temperature is performed at a first pre-defined rate of increase; and calcining the mixture by raising and maintaining temperature of the mixture to a third temperature for a third duration of time, wherein the raising of temperature is performed at a second pre-defined rate of increase.

In another exemplary embodiment, a method of preparing a Ni—Fe—MgO based catalyst is disclosed where the method comprises creating a solution by dissolving in a solvent calculated quantities of precursors Ni(NO3)2.6H2O, Fe(NO3)3.9H2O, and Mg(NO3)2.6H2O; creating a mixture by adding the solution to a substrate; raising and maintaining temperature of the mixture to a first temperature for a first duration of time, wherein the raising of temperature is at a first pre-defined rate of increase; and calcining the mixture by raising and maintaining temperature of the mixture to a second temperature for a second duration of time, wherein the raising of temperature is at a second pre-defined rate of increase.

In an exemplary embodiment, a Ni—Fe—MgO catalyst is disclosed, where the catalyst comprises a calcined mixture of NiO, FeOx, and MgO used as a catalyst at an operating temperature, wherein the calcined mixture comprises Ni to Fe to MgO in a ratio between 10:8:30 by weight and 20:40:40 by weight, wherein the ratio of Ni to Fe and MgO is between 10 and 60, the ratio of Fe to Ni and MgO is between 10 and 40, and the ratio of MgO to Ni and Fe is between 10 and 40, and wherein the operating temperature is between 500° C. and 900° C.

Depletion of fossil fuels and associated environmental problems has stimulated the development of alternative renewable energy sources. Biomass resources are a potential source of energy and chemicals. The thermo-chemical processing of biomass results in a producer gas which can be utilized for the production of power, fuels, and chemicals. The producer gas commonly includes $H_2$, CO, $CO_2$, $H_2O$, $CH_4$, $C_2$-$C_5$ hydrocarbons, tars, $NH_3$ and $H_2S$. The tar components which consist of a mixture of aromatic hydrocarbons are condensable at room temperatures. The tars components are removed from the producer gas before it enters any downstream processes at least because the tars can cause severe fouling and corrosion problems.

One of the preferred ways of removing tars is to perform steam reforming on a catalyst, decomposing those into COx and H$_2$. In an exemplary embodiment, this catalyst can also be applied to the bed material used in a fluid bed gasifier or in a regenerative reforming process, reducing tars to a significant extent. In an exemplary embodiment, a new catalyst formulation evaluated on a gasifier bed material is highly active for tar decomposition at a lower temperature. The new catalyst formulation shows no coke deposition and thus, visibly no change in tar conversion was observed in 48 hrs. As discussed below and shown in Figures, the catalyst also recovers to almost 100% tar conversion efficiency after sulfur poisoning and both higher efficiency and faster recovery than a reference National Renewable Energy Laboratory (NREL) catalyst.

The dual fluidized-bed (DFB) steam gasification is an advantageous approach for the synthesis of a nitrogen-free producer gas with a high heating value. Downstream gas-cleaning steps required for subsequent utilization are relatively expensive. The removal of tars by the use of catalyzed bed material inside the gasifier can result in reduced gas-cleaning costs. The uncatalysed gasifier bed materials including olivine, dolomite, silica sand, and limestone display only moderate activity for tar removal. If bed material is impregnated with a catalyst, tar content can be significantly reduced during the gasification or in a similar regenerative reforming process. Pure Ni catalyst suffers from drawbacks like coke formation leading to deactivation of the catalyst as well as sintering of Ni particles at high temperature. However, Ni-catalyst performance can be improved by alloying with other metals, or using an oxide promoter in the catalyst formulation.

Ni catalysts formulations can include additional metal such as Cu, Mo, Co, and Fe. Among these metals, alloying Fe with Ni has been useful. Due to higher affinity for oxygen, Fe can enhance the availability of oxygen for coke removal from the metal surface. It has been observed that an improved performance in the steam reforming activity of Ni—Fe/Al$_2$O$_3$ catalysts is due to the presence of an intimate interaction between Fe and Ni, resulting in the formation of a Ni—Fe alloy. In addition, the presence of uniform Ni—Fe alloy particles in Ni—Fe/Mg/Al catalysts enables a high catalytic performance in the steam reforming of toluene and phenol.

A number of oxide promoters have been used for Ni and Ni—Fe combinations. The addition of a redox component like CeO$_2$ enhanced the activity of Ni as well as Ni—Fe alloy. The oxide vacancy site on CeO$_2$ acting as a H$_2$O adsorption and desorption center could be responsible for higher activity. Alkaline earth oxide promoter CaO into Ni—Fe, Ni—Al$_2$O$_3$, Ni—Fe—Al$_2$O$_3$ catalysts also improved the steam reforming reactions. Ni supported on Mayenite (Ca$_{12}$Al$_{14}$O$_{33}$ or 12CaO.7Al$_2$O$_3$) phase had remarkable activity and stability. These oxide increase the interfacial distance between the Ni particles and reduces the chance of agglomeration without interacting with them.

The presence of alkaline earth promoter and Fe together can enhance the activity and stability of Ni catalyst. Fortunately, Ni impregnated on natural olivine has improved catalytic activity for tar decomposition. The characterization of Ni/Olivine revealed that Ni can interact with Fe and MgO and enhance the activity. Moreover, Ni/Fe/Mg/Al containing catalyst showed improved results for toluene reforming as compared to other Ni based catalysts. Although, Ni—Fe alloy have been supported on Mg—Al oxide mixture obtained from hydrotalcite composition, the positive role of MgO along with Ni to Fe ratio in the Ni—Fe alloy has not been optimized so far. Since toluene conversion activity on Ni—Fe alloy in presence of CaO was found to increase significantly by replacing with MgO, this patent document discloses the development and benefits of a catalyst containing the optimum Ni—Fe—MgO composition for application in the gasifier bed material.

In embodiments, the catalyst includes at least 30 wt % Ni. In embodiments, the catalyst includes at least 35 wt % Ni. In embodiments, the catalyst includes at least 40 wt % Ni. In embodiments, the catalyst includes at least 45 wt % Ni. In embodiments, the catalyst includes at least 50 wt % Ni. In embodiments, the catalyst includes at least 10 wt % Fe. In embodiments, the catalyst includes at least 15 wt % Fe. In embodiments, the catalyst includes at least 20 wt % Fe. In embodiments, the catalyst includes at least 25 wt % Fe. In embodiments, the catalyst includes at least 30 wt % Fe. In embodiments, the catalyst includes at least 20 wt % MgO. In embodiments, the catalyst includes at least 25 wt % MgO. In embodiments, the catalyst includes at least 30 wt % MgO.

In embodiments, the catalyst comprises Ni to Fe to MgO in a weight ratio of about 30 to 60 wt % Ni to 10 to 30 wt % Fe to 20 to 50 wt % MgO. In embodiments, the weight ratio is about 40 to 50 wt % Ni to 15 to 25 wt % Fe to 30 to 40 wt % MgO. In embodiments, the weight ratio is about 42-48 wt % Ni to 17-23 wt % Fe to 32-38 wt % MgO. In embodiments, the weight ratio is about 45 wt % Ni to 20 wt % Fe to 35 wt % MgO. In embodiments, the weight ratio is 45 wt % Ni to 20 wt % Fe to 35 wt % MgO. In embodiments, the catalyst further comprises an FeNi$_3$ alloy. In embodiments, the catalyst includes NiO. In embodiments, the catalyst includes Mg$_{1-x}$Ni$_x$O, wherein x is an integer from 2 to 100. In embodiments, the catalyst includes nickel oxide (e.g., NiO, Ni$_2$O$_3$, or NiO$_2$), iron oxide (e.g., FeO, Fe$_3$O$_4$, Fe$_4$O$_5$, Fe$_5$O$_6$, Fe$_5$O$_7$, Fe$_{25}$O$_{32}$, or Fe13019), magnesium oxide (e.g., MgO), or alloys thereof resulting from calcining (e.g., exposure to elevated temperatures such as 850° C. for an extended period of time).

In embodiments, the catalyst includes 30 to 60 wt % nickel. In embodiments, the catalyst includes 35 to 55 wt % nickel. In embodiments, the catalyst includes 40 to 50 wt % nickel. In embodiments, the catalyst includes 42 wt % to 48 wt % nickel. In embodiments, the catalyst includes 45 wt % nickel. In embodiments, the catalyst includes about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or about 60 wt % nickel.

In embodiments, the catalyst includes 10 to 30 wt % iron. In embodiments, the catalyst includes 15 to 25 wt % iron. In embodiments, the catalyst includes 20 wt % iron. In embodiments, the catalyst includes about 10, 11, 12, 13, 14, 15, 16, 17, 18, 19, 20, 21, 22, 23, 24, 25, 26, 27, 28, 29, or about 30 wt % iron.

In embodiments, the catalyst includes 20 to 50 wt % magnesium dioxide. In embodiments, the catalyst includes 25 to 45 wt % magnesium dioxide. In embodiments, the catalyst includes 30 to 40 wt % magnesium dioxide. In embodiments, the catalyst includes 35 wt % magnesium dioxide. In embodiments, the catalyst includes about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or about 50 wt % magnesium dioxide.

In embodiments, the weight ratio of nickel to the total weight of nickel and iron, i.e. Ni/(Ni+Fe), is less than 0.7. In embodiments, the weight ratio of nickel to the total weight of nickel and iron, i.e. Ni/(Ni+Fe), is 0.69. In embodiments, the weight ratio of nickel to the total weight of nickel and iron, i.e. Ni/(Ni+Fe), is 0.68. In embodiments, the weight ratio of nickel to the total weight of nickel and iron, i.e. Ni/(Ni+Fe), is 0.67. In embodiments, the weight ratio of nickel to the total weight of nickel and iron, i.e. Ni/(Ni+Fe), is 0.66. In embodiments, the weight ratio of nickel to the total weight of nickel and iron, i.e. Ni/(Ni+Fe), is 0.65.

In embodiments, the weight ratio of magnesium oxide to the total weight of nickel and iron, i.e. MgO/(Ni+Fe), is less than 0.60. In embodiments, the weight ratio of magnesium oxide to the total weight of nickel and iron, i.e. MgO/(Ni+Fe), is about 0.60. In embodiments, the weight ratio of magnesium oxide to the total weight of nickel and iron, i.e. MgO/(Ni+Fe), is about 0.58. In embodiments, the weight ratio of magnesium oxide to the total weight of nickel and iron, i.e. MgO/(Ni+Fe), is about 0.55. In embodiments, the weight ratio of magnesium oxide to the total weight of nickel and iron, i.e. MgO/(Ni+Fe), is about 0.53. In embodiments, the weight ratio of magnesium oxide to the total weight of nickel and iron, i.e. MgO/(Ni+Fe), is about 0.52. In embodiments, the weight ratio of magnesium oxide to the total weight of nickel and iron, i.e. MgO/(Ni+Fe), is about 0.50.

In embodiments, the catalyst further includes a substrate support. In embodiments, the substrate support includes one or more of the ceramic, olivine, dolomite, calcium carbonate, aluminum oxide, silicon dioxide, titanium dioxide, and iron oxide. In embodiments, the substrate support is ceramic, olivine, dolomite, calcium carbonate, aluminum oxide, silicon dioxide, titanium dioxide, or iron oxide. In embodiments, the substrate support is sintered bauxite. In embodiments, the substrate support includes aluminum oxide, silicon dioxide, titanium dioxide, and iron oxide (e.g., Carbo HSP). In embodiments, the substrate support includes aluminum oxide. In embodiments, the substrate support includes silicon dioxide. In embodiments, the substrate support includes titanium dioxide. In embodiments, the substrate support includes iron oxide. In embodiments, the substrate support is CarboHSP. In embodiments, the substrate support is spherical and about 400 to about 600 µm in diameter. In embodiments, the substrate support is a nanoparticle. In embodiments, the substrate support is a microparticle. In embodiments, the substrate support is a sintered bauxite support, a non-porous commercially available synthetic mineral that includes, for example, a mixture of $Al_2O_3$ (83%), $SiO_2$ (5%), $TiO_2$ (3.5%), $Fe_2O_3$ (7%). In embodiments, the catalyst is impregnated onto a substrate support. In embodiments, the catalyst is not prepared via co-precipitation. In embodiments, the support is chemically inert (e.g., does not participate in the reformation of tar).

In embodiments, the substrate support is a monolithic substrate support. A monolithic substrate support as used herein refers to a catalyst support which includes many parallel channels separated by thin walls that are coated with the catalytic active substance (e.g., the catalyst described herein). In embodiments, the channels are round or polygonal.

Figure 14:
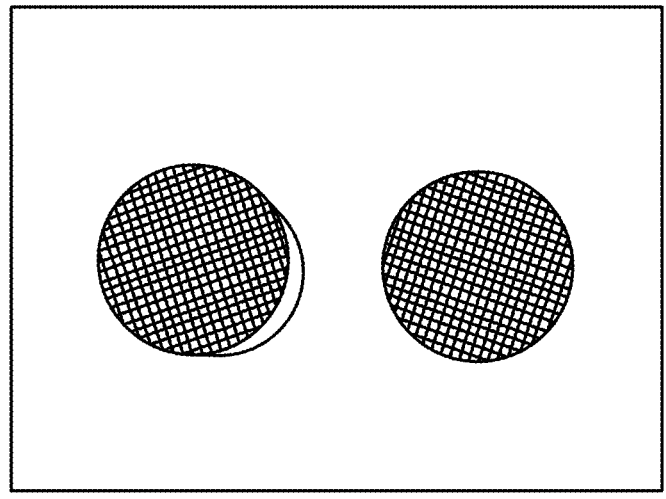
FIG. 14. Ceramic honeycomb substrate support (2.54 cm diameter×2.5 cm length)—400 cells/in². The leftmost support is bare ceramic honeycomb substrate support; the rightmost support is the catalyst coated ceramic honeycomb substrate support.

In embodiments, the catalyst has a honeycomb structure (e.g., see for example FIG. 14). In embodiments, the substrate support has a honeycomb structure (e.g., see for example FIG. 14). In embodiments, the substrate support is a cordierite substrate support with a honeycomb structure. In embodiments, following loading the catalyst onto the substrate support, the substrate support further includes $SiO_2$. In embodiments, the substrate support further includes $SiO_2$ at 2 to 10 wt % of the total weight of the catalyst loaded support. In embodiments, the substrate support further includes $SiO_2$ at 2 to 8 wt % of the total weight. In embodiments, the substrate support further includes $SiO_2$ at 4 to 6 wt % of the total weight. In embodiments, the substrate support further includes $SiO_2$ at 6 to 7 wt % of the total weight. In embodiments, the substrate support further includes $SiO_2$ at 6.5 wt % of the total weight.

In embodiments, the catalyst to substrate support weight ratio is 0.5-5.0%. In embodiments, the catalyst to substrate support weight ratio is 0.75 to 1.15%. In embodiments, the catalyst to substrate support weight ratio is 0.75%. In embodiments, the catalyst to substrate support weight ratio is 1.15%. In embodiments, the catalyst to substrate support weight ratio is 0.5, 0.55, 0.6, 0.65, 0.7, 0.75, 0.8, 0.85, 0.9, 0.95, 1.0, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, 2.0, 2.05, 2.1, 2.15, 2.2, 2.25, 2.3, 2.35, 2.4, 2.45, 2.5, 2.55, 2.6, 2.65, 2.7, 2.75, 2.8, 2.85, 2.9, 2.95, 3.0, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, 3.95, 4.0, 4.05, 4.1, 4.15, 4.2, 4.25, 4.3, 4.35, 4.4, 4.45, 4.5, 4.55, 4.6, 4.65, 4.7, 4.75, 4.8, 4.85, 4.9, 4.95, or about 5.0%. In embodiments, the substrate support includes $Al_2O_3$ (e.g., about 83 wt %), $SiO_2$ (e.g., 5 wt %), $TiO_2$ (e.g., 3.5 wt %), and $Fe_2O_3$ (e.g., 7 wt %). In embodiments, the catalyst is coated on the surface of the substrate support.

In embodiments, the catalyst is 40 wt % Ni, 20 wt % Fe, and 40 wt % MgO. In embodiments, the catalyst is 40 wt % Ni, 21 wt % Fe, and 39 wt % MgO. In embodiments, the catalyst is 40 wt % Ni, 22 wt % Fe, and 38 wt % MgO. In embodiments, the catalyst is 40 wt % Ni, 23 wt % Fe, and 37 wt % MgO. In embodiments, the catalyst is 40 wt % Ni, 24 wt % Fe, and 36 wt % MgO. In embodiments, the catalyst is 40 wt % Ni, 25 wt % Fe, and 35 wt % MgO. In embodiments, the catalyst is 41 wt % Ni, 19 wt % Fe, and 40 wt % MgO. In embodiments, the catalyst is 41 wt % Ni, 20 wt % Fe, and 39 wt % MgO. In embodiments, the catalyst is 41 wt % Ni, 21 wt % Fe, and 38 wt % MgO. In embodiments, the catalyst is 41 wt % Ni, 22 wt % Fe, and 37 wt % MgO. In embodiments, the catalyst is 41 wt % Ni, 23 wt % Fe, and 36 wt % MgO. In embodiments, the catalyst is 41 wt % Ni, 24 wt % Fe, and 35 wt % MgO. In embodiments, the catalyst is 41 wt % Ni, 25 wt % Fe, and 34 wt % MgO. In embodiments, the catalyst is 42 wt % Ni, 18 wt % Fe, and 40 wt % MgO. In embodiments, the catalyst is 42 wt % Ni, 19 wt % Fe, and 39 wt % MgO. In embodiments, the catalyst is 42 wt % Ni, 20 wt % Fe, and 38 wt % MgO. In embodiments, the catalyst is 42 wt % Ni, 21 wt % Fe, and 37 wt % MgO. In embodiments, the catalyst is 42 wt % Ni, 22 wt % Fe, and 36 wt % MgO. In embodiments, the catalyst is 42 wt % Ni, 23 wt % Fe, and 35 wt % MgO. In embodiments, the catalyst is 42 wt % Ni, 24 wt % Fe, and 34 wt % MgO. In embodiments, the catalyst is 42 wt % Ni, 25 wt % Fe, and 33 wt % MgO. In embodiments, the catalyst is 43 wt % Ni, 17 wt % Fe, and 40 wt % MgO. In embodiments, the catalyst is 43 wt % Ni, 18 wt % Fe, and 39 wt % MgO. In embodiments, the catalyst is 43 wt % Ni, 19 wt % Fe, and 38 wt % MgO. In embodiments, the catalyst is 43 wt % Ni, 20 wt % Fe, and 37 wt % MgO. In embodiments, the catalyst is 43 wt % Ni, 21 wt % Fe, and 36 wt % MgO. In embodiments, the catalyst is 43 wt % Ni, 22 wt % Fe, and 35 wt % MgO. In embodiments, the catalyst is 43 wt % Ni, 23 wt % Fe, and 34 wt % MgO. In embodiments, the catalyst is 43 wt % Ni, 24 wt % Fe, and 33 wt % MgO. In embodiments, the catalyst is 43 wt % Ni, 25 wt % Fe, and 32 wt % MgO. In embodiments, the catalyst is 44 wt % Ni, 16 wt % Fe, and 40 wt % MgO. In embodiments, the catalyst is 44 wt % Ni, 17 wt % Fe, and 39 wt % MgO. In embodiments, the catalyst is 44 wt % Ni, 18 wt % Fe, and 38 wt % MgO. In embodiments, the catalyst is 44 wt % Ni, 19 wt % Fe, and 37 wt % MgO. In embodiments, the catalyst is 44 wt % Ni, 20 wt % Fe, and 36 wt % MgO. In embodiments, the catalyst is 44 wt % Ni, 21 wt % Fe, and 35 wt % MgO. In embodiments, the catalyst is 44 wt % Ni, 22 wt % Fe, and 34 wt % MgO. In embodiments, the catalyst is 44 wt % Ni, 23 wt % Fe, and 33 wt % MgO. In embodiments, the catalyst is 44 wt % Ni, 24 wt % Fe, and 32 wt % MgO. In embodiments, the catalyst is 44 wt % Ni, 25 wt % Fe, and 31 wt % MgO. In embodiments, the catalyst is 45 wt % Ni, 15 wt % Fe, and 40 wt % MgO. In embodiments, the catalyst is 45 wt % Ni, 16 wt % Fe, and 39 wt % MgO. In embodiments, the catalyst is 45 wt % Ni, 17 wt % Fe, and 38 wt % MgO. In embodiments, the catalyst is 45 wt % Ni, 18 wt % Fe, and 37 wt % MgO. In embodiments, the catalyst is 45 wt % Ni, 19 wt % Fe, and 36 wt % MgO. In embodiments, the catalyst is 45 wt % Ni, 20 wt % Fe, and 35 wt % MgO. In embodiments, the catalyst is 45 wt % Ni, 21 wt % Fe, and 34 wt % MgO. In embodiments, the catalyst is 45 wt % Ni, 22 wt % Fe, and 33 wt % MgO. In embodiments, the catalyst is 45 wt % Ni, 23 wt % Fe, and 32 wt % MgO. In embodiments, the catalyst is 45 wt % Ni, 24 wt % Fe, and 31 wt % MgO. In embodiments, the catalyst is 45 wt % Ni, 25 wt % Fe, and 30 wt % MgO. In embodiments, the catalyst is 46 wt % Ni, 15 wt % Fe, and 39 wt % MgO. In embodiments, the catalyst is 46 wt % Ni, 16 wt % Fe, and 38 wt % MgO. In embodiments, the catalyst is 46 wt % Ni, 17 wt % Fe, and 37 wt % MgO. In embodiments, the catalyst is 46 wt % Ni, 18 wt % Fe, and 36 wt % MgO. In embodiments, the catalyst is 46 wt % Ni, 19 wt % Fe, and 35 wt % MgO. In embodiments, the catalyst is 46 wt % Ni, 20 wt % Fe, and 34 wt % MgO. In embodiments, the catalyst is 46 wt % Ni, 21 wt % Fe, and 33 wt % MgO. In embodiments, the catalyst is 46 wt % Ni, 22 wt % Fe, and 32 wt % MgO. In embodiments, the catalyst is 46 wt % Ni, 23 wt % Fe, and 31 wt % MgO. In embodiments, the catalyst is 46 wt % Ni, 24 wt % Fe, and 30 wt % MgO. In embodiments, the catalyst is 47 wt % Ni, 15 wt % Fe, and 38 wt % MgO. In embodiments, the catalyst is 47 wt % Ni, 16 wt % Fe, and 37 wt % MgO. In embodiments, the catalyst is 47 wt % Ni, 17 wt % Fe, and 36 wt % MgO. In embodiments, the catalyst is 47 wt % Ni, 18 wt % Fe, and 35 wt % MgO. In embodiments, the catalyst is 47 wt % Ni, 19 wt % Fe, and 34 wt % MgO. In embodiments, the catalyst is 47 wt % Ni, 20 wt % Fe, and 33 wt % MgO. In embodiments, the catalyst is 47 wt % Ni, 21 wt % Fe, and 32 wt % MgO. In embodiments, the catalyst is 47 wt % Ni, 22 wt % Fe, and 31 wt % MgO. In embodiments, the catalyst is 47 wt % Ni, 23 wt % Fe, and 30 wt % MgO. In embodiments, the catalyst is 48 wt % Ni, 15 wt % Fe, and 37 wt % MgO. In embodiments, the catalyst is 48 wt % Ni, 16 wt % Fe, and 36 wt % MgO. In embodiments, the catalyst is 48 wt % Ni, 17 wt % Fe, and 35 wt % MgO. In embodiments, the catalyst is 48 wt % Ni, 18 wt % Fe, and 34 wt % MgO. In embodiments, the catalyst is 48 wt % Ni, 19 wt % Fe, and 33 wt % MgO. In embodiments, the catalyst is 48 wt % Ni, 20 wt % Fe, and 32 wt % MgO. In embodiments, the catalyst is 48 wt % Ni, 21 wt % Fe, and 31 wt % MgO. In embodiments, the catalyst is 48 wt % Ni, 22 wt % Fe, and 30 wt % MgO. In embodiments, the catalyst is 49 wt % Ni, 15 wt % Fe, and 36 wt % MgO. In embodiments, the catalyst is 49 wt % Ni, 16 wt % Fe, and 35 wt % MgO. In embodiments, the catalyst is 49 wt % Ni, 17 wt % Fe, and 34 wt % MgO. In embodiments, the catalyst is 49 wt % Ni, 18 wt % Fe, and 33 wt % MgO. In embodiments, the catalyst is 49 wt % Ni, 19 wt % Fe, and 32 wt % MgO. In embodiments, the catalyst is 49 wt % Ni, 20 wt % Fe, and 31 wt % MgO. In embodiments, the catalyst is 49 wt % Ni, 21 wt % Fe, and 30 wt % MgO. In embodiments, the catalyst is 50 wt % Ni, 15 wt % Fe, and 35 wt % MgO. In embodiments, the catalyst is 50 wt % Ni, 16 wt % Fe, and 34 wt % MgO. In embodiments, the catalyst is 50 wt % Ni, 17 wt % Fe, and 33 wt % MgO. In embodiments, the catalyst is 50 wt % Ni, 18 wt % Fe, and 32 wt % MgO. In embodiments, the catalyst is 50 wt % Ni, 19 wt % Fe, and 31 wt % MgO. In embodiments, the catalyst is 50 wt % Ni, 20 wt % Fe, and 30 wt % MgO.

In embodiments, the ratio of iron to nickel is 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.87, 0.88, 0.9, 0.91, 0.93, 0.94, or 0.97. In embodiments, the ratio of iron to nickel is 0.40. In embodiments, the ratio of iron to nickel is 0.41. In embodiments, the ratio of iron to nickel is 0.42. In embodiments, the ratio of iron to nickel is 0.43. In embodiments, the ratio of iron to nickel is 0.44. In embodiments, the ratio of iron to nickel is 0.45. In embodiments, the ratio of iron to nickel is 0.46. In embodiments, the ratio of iron to nickel is 0.47. In embodiments, the ratio of iron to nickel is 0.48. In embodiments, the ratio of iron to nickel is 0.49. In embodiments, the ratio of iron to nickel is 0.50.

In embodiments, the catalyst does not include potassium. In embodiments, the catalyst does not include potassium dioxide. In embodiments, the catalyst reduces coke formation relative to a control (e.g., relative to a Ni—K—MgO reference catalyst).

III. Methods of Making and Use

In an aspect is provided a method of making a nickel-iron-magnesium oxide catalyst, the method including: (a) mixing nickel nitrate, iron nitrate, and magnesium nitrate in a solvent; (b) combining the solution of step (a) with a substrate support to form a mixture; (c) maintaining the mixture of step (b) at a first temperature ($T_1$) for a first duration of time ($t_1$); (d) increasing the temperature of the mixture in step (c) to a second temperature ($T_2$) and maintaining $T_2$ for a second duration of time ($t_2$), wherein the increasing of the temperature is performed at a first rate of increase ($R_1$); and (e) calcining the mixture of step (d) by increasing the temperature of the mixture of step (d) to a third temperature ($T_3$) and maintaining $T_3$ for a third duration of time ($t_3$), wherein the increasing of the temperature is performed at a second rate of increase ($R_2$). $T_1$ is about 15° C. to about 30° C. and $t_1$ is 1 to 12 hours; $T_2$ is about 80° C. to about 120° C. and $t_2$ is 12 to 15 hours; $T_3$ is about 600° C. to about 1000° C. and $t_3$ is 12 to about 15 hours; $R_1$ is about 1° C./minute to about 15° C./minute; and $R_2$ is 15° C./minute, or 50° C./30 minutes to about 100° C./30 minutes; thereby forming a nickel-iron-magnesium oxide catalyst. In embodiments, the method further comprises (f) maintaining the mixture of step (e) at a first temperature ($T_4$) for a first duration of time ($t_4$) in the presence of hydrogen gas, wherein $T_4$ is 850° C. and $t_4$ is at least one hour. In embodiments $t_4$ is 1 to 2 hours. In embodiments $t_4$ is 2 hours.

In embodiments, the nickel nitrate is in hydrate form, and may be written for example as $Ni(NO_3)_2 \cdot 6H_2O$. In embodiments, iron nitrate is in hydrate form, and may be written for example as $Fe(NO_3)_3 \cdot 9H_2O$. In embodiments, the magnesium nitrate is in hydrate form, and may be written for example as $Mg(NO_3)_2 \cdot 6H_2O$.

In embodiments, $T_1$ is about 15° C. to about 30° C. In embodiments, $T_1$ is about 15° C. to about 20° C. In embodiments, $T_1$ is about 20° C. to about 30° C. In embodiments, $T_1$ is about 25° C. In embodiments, $T_1$ is 15° C. to about 30° C. In embodiments, $T_1$ is 15° C. to about 20° C. In embodiments, $T_1$ is 20° C. to about 30° C. In embodiments, $T_1$ is 25° C.

In embodiments, $t_1$ is 1 to 12 hours. In embodiments, $t_1$ is 1 to 6 hours. In embodiments, $t_1$ is 3 to 6 hours. In embodiments, $t_1$ is about 1 hour. In embodiments, $t_1$ is about 2 hours. In embodiments, $t_1$ is about 3 hours. In embodiments, $t_1$ is about 4 hours. In embodiments, $t_1$ is about 5 hours. In embodiments, $t_1$ is about 6 hours. In embodiments, $t_1$ is about 7 hours. In embodiments, $t_1$ is about 8 hours. In embodiments, $t_1$ is about 9 hours. In embodiments, $t_1$ is about 10 hours. In embodiments, $t_1$ is about 11 hours. In embodiments, $t_1$ is about 12 hours.

In embodiments, $T_2$ is about 80° C. to about 120° C. In embodiments, $T_2$ is about 100° C. to about 120° C. In embodiments, $T_2$ is about 90° C. to about 110° C. In embodiments, $T_2$ is about 80° C. In embodiments, $T_2$ is about 85° C. In embodiments, $T_2$ is about 90° C. In embodiments, $T_2$ is about 95° C. In embodiments, $T_2$ is about 100° C. In embodiments, $T_2$ is about 105° C. In embodiments, $T_2$ is about 110° C. In embodiments, $T_2$ is 80° C. to about 120° C. In embodiments, $T_2$ is 100° C. to about 120° C. In embodiments, $T_2$ is 90° C. to about 110° C. In embodiments, $T_2$ is 80° C. In embodiments, $T_2$ is 85° C. In embodiments, $T_2$ is 90° C. In embodiments, $T_2$ is 95° C. In embodiments, $T_2$ is 100° C. In embodiments, $T_2$ is 105° C. In embodiments, $T_2$ is 110° C.

In embodiments, $t_2$ is about 12 to about 15 hours. In embodiments, $t_2$ is about 12 hours. In embodiments, $t_2$ is about 13 hours. In embodiments, $t_2$ is about 14 hours. In embodiments, $t_2$ is about 15 hours.

In embodiments, $T_3$ is about 600° C. to about 1000° C. In embodiments, $T_3$ is about 600, 625, 650, 675, 700, 725, 750, 775, 800, 825, 850, 875, 900, 925, 950, 975, or about 1000° C. In embodiments, $T_3$ is 600° C. to about 1000° C. In embodiments, $T_3$ is 600, 625, 650, 675, 700, 725, 750, 775, 800, 825, 850, 875, 900, 925, 950, 975, or 1000° C.

In embodiments, $t_3$ is about 12 to about 15 hours. In embodiments, $t_3$ is about 12 hours. In embodiments, $t_3$ is about 13 hours. In embodiments, $t_3$ is about 14 hours. In embodiments, $t_3$ is about 15 hours.

In embodiments, $R_1$ is about 1° C./minute to about 15° C./minute. In embodiments, $R_1$ is about 1° C./minute. In embodiments, $R_1$ is about 2° C./minute. In embodiments, $R_1$ is about 3° C./minute. In embodiments, $R_1$ is about 4° C./minute. In embodiments, $R_1$ is about 5° C./minute. In embodiments, $R_1$ is about 6° C./minute. In embodiments, $R_1$ is about 7° C./minute. In embodiments, $R_1$ is about 8° C./minute. In embodiments, $R_1$ is about 9° C./minute. In embodiments, $R_1$ is about 10° C./minute. In embodiments, $R_1$ is about 11° C./minute. In embodiments, $R_1$ is about 12° C./minute. In embodiments, $R_1$ is about 13° C./minute. In embodiments, $R_1$ is about 14° C./minute. In embodiments, $R_1$ is about 15° C./minute.

In embodiments, $R_2$ is 50° C./30 minutes to about 100° C./30 minutes. In embodiments, $R_2$ is 60° C./30 minutes to about 100° C./30 minutes. In embodiments, $R_2$ is 70° C./30 minutes to about 100° C./30 minutes. In embodiments, $R_2$ is 80° C./30 minutes to about 100° C./30 minutes.

In embodiments, $R_2$ is about 50° C./30 minutes. In embodiments, $R_2$ is about 55° C./30 minutes. In embodiments, $R_2$ is about 60° C./30 minutes. In embodiments, $R_2$ is about 65° C./30 minutes. In embodiments, $R_2$ is about 70° C./30 minutes. In embodiments, $R_2$ is about 75° C./30 minutes. In embodiments, $R_2$ is about 80° C./30 minutes. In embodiments, $R_2$ is about 85° C./30 minutes. In embodiments, $R_2$ is about 90° C./30 minutes. In embodiments, $R_2$ is about 95° C./30 minutes. In embodiments, $R_2$ is about 100° C./30 minutes.

In embodiments, $R^2$ includes an initial rate and a secondary rate. For example, $R^2$ may include an initial rate (e.g., ramp rate) of about 15° C./minute and a secondary rate of about 50° C./30 minutes.

In embodiments, $T_1$ is about 15° C. to about 25° C. and $t_1$ is 3 to 6 hours. In embodiments, $T_2$ is about 100° C. to about 120° C. and $t_2$ is 12 to 15 hours. In embodiments, $T_3$ is about 850° C. and $t_3$ is 12 to about 15 hours. In embodiments, $R_1$ is 15° C./minute; and $R_2$ is 50° C./30 minutes.

In embodiments, $T_1$ is about 15° C. to about 25° C. and $t_1$ is 3 to 6 hours; $T_2$ is about 100° C. to about 120° C. and $t_2$ is 12 to 15 hours; $T_3$ is about 850° C. and $t_3$ is 12 to about 15 hours; $R_1$ is 15° C./minute; and $R_2$ is 50° C./30 minutes.

In embodiments, the solvent is water, a salt solution, or an organic solvent (e.g. acetonitrile, methanol, THF, or isopropanol). In embodiments, the solvent is water. In embodiments, the substrate support is cordierite. In embodiments, the substrate support has a honeycomb structure.

The method further includes reducing the catalyst in a nitrogen atmosphere, in a hydrogen atmosphere, or in a nitrogen and hydrogen atmosphere.

In an aspect is provided a method of reducing tar from a gas mixture, the method comprising contacting a catalyst as described herein, including embodiments, with the gas mixture at an operating temperature from about 300° C. to about 1000° C. In embodiments, the catalyst further includes a substrate support. In embodiments, the catalyst includes a substrate support with a honeycomb structure. In embodiments, the substrate support includes $SiO_2$. In embodiments, the substrate support includes about 6.5 wt % of $SiO_2$. In embodiments, the substrate support is coated with $SiO_2$ (e.g., a colloidal solution of silica). In embodiments, following coating the support with $SiO_2$, it is calcined in air by raising the temperature an interval of 50 degree with 15 min dwelling at each point up to 800° C. and then left at this temperature for 15 hrs.

In embodiments, the level of tar is reduced by about 1% following contact with the catalyst described herein. In embodiments, the level of tar is reduced by about 10% following contact with the catalyst described herein. In embodiments, the level of tar is reduced by about 20% following contact with the catalyst described herein. In embodiments, the level of tar is reduced by about 30% following contact with the catalyst described herein. In embodiments, the level of tar is reduced by about 40% following contact with the catalyst described herein. In embodiments, the level of tar is reduced by about 50% following contact with the catalyst described herein. In embodiments, the level of tar is reduced by about 60% following contact with the catalyst described herein. In embodiments, the level of tar is reduced by about 70% following contact with the catalyst described herein. In embodiments, the level of tar is reduced by about 80% following contact with the catalyst described herein. In embodiments, the level of tar is reduced by about 90% following contact with the catalyst described herein. In embodiments, the level of tar is reduced by about 95% following contact with the catalyst described herein. In embodiments, the level of tar is reduced by about 99% following contact with the catalyst described herein. In embodiments, the level of tar is reduced by about 100% following contact with the catalyst described herein.

In embodiments, the operating temperature from about 300° C. to about 900° C. In embodiments, the operating temperature from about 400° C. to about 900° C. In embodiments, the operating temperature from about 500° C. to about 900° C. In embodiments, the operating temperature from about 600° C. to about 900° C. In embodiments, the operating temperature from about 600° C. to about 850° C. In embodiments, the operating temperature from about 600° C. to about 650° C. In embodiments, the operating temperature from about 600° C. to about 700° C. In embodiments, the operating temperature from about 650° C. to about 850° C. In embodiments, the operating temperature is less than 850° C. In embodiments, the operating temperature is less than 700° C. In embodiments the operating temperature is about 600° C. In embodiments the operating temperature is about 650° C. In embodiments the operating temperature is about 700° C. In embodiments the operating temperature is about 300, 325, 350, 375, 400, 425, 450, 475, 500, 525, 550, 575, 600, 625, 650, 675, 700, 725, 750, 775, 800, 825, 850, 875, 900, 925, 950, 975, or about 1000° C. In embodiments the operating temperature is about 300° C. In embodiments the operating temperature is about 325° C. In embodiments the operating temperature is about 350° C. In embodiments the operating temperature is about 375° C. In embodiments the operating temperature is about 400° C. In embodiments the operating temperature is about 425° C. In embodiments the operating temperature is about 450° C. In embodiments the operating temperature is about 475° C. In embodiments the operating temperature is about 500° C. In embodiments the operating temperature is about 525° C. In embodiments the operating temperature is about 550° C. In embodiments the operating temperature is about 575° C. In embodiments the operating temperature is about 600° C. In embodiments the operating temperature is about 625° C. In embodiments the operating temperature is about 650° C. In embodiments the operating temperature is about 675° C. In embodiments the operating temperature is about 700° C. In embodiments the operating temperature is about 725° C. In embodiments the operating temperature is about 750° C. In embodiments the operating temperature is about 775° C. In embodiments the operating temperature is about 800° C. In embodiments the operating temperature is about 825° C. In embodiments the operating temperature is about 850° C. In embodiments the operating temperature is about 875° C. In embodiments the operating temperature is about 900° C. In embodiments the operating temperature is about 925° C. In embodiments the operating temperature is about 950° C. In embodiments the operating temperature is about 975° C. In embodiments the operating temperature is about 1000° C.

In embodiments the gas mixture includes tar. In embodiments, the gas mixture includes $H_2$, CO, $CO_2$, $H_2O$, $CH_4$, $C_2$-$C_5$ hydrocarbons, tar, $NH_3$ or $H_2S$. In embodiments, the gas mixture includes at least 5% $H_2O$. In embodiments, the gas mixture includes at least 5 to 50% $H_2O$. In embodiments, the gas mixture includes at least 10 to 40% $H_2O$. In embodiments, the gas mixture includes at least 15 to 30% $H_2O$. In embodiments, the gas mixture includes at least 5% $H_2O$. In embodiments, the gas mixture includes at least 10% $H_2O$. In embodiments, the gas mixture includes at least 15% $H_2O$. In embodiments, the gas mixture includes at least 20%

$H_2O$. In embodiments, the gas mixture includes at least 25% $H_2O$. In embodiments, the gas mixture includes at least 30% $H_2O$. In embodiments, the gas mixture includes at least 35% $H_2O$. In embodiments, the gas mixture includes at least 40% $H_2O$. In embodiments, the gas mixture includes at least 45% $H_2O$. In embodiments, the gas mixture includes at least 50% $H_2O$. In embodiments, the gas mixture includes about 5% $H_2O$. In embodiments, the gas mixture includes about 5 to 50% $H_2O$. In embodiments, the gas mixture includes about 10 to 40% $H_2O$. In embodiments, the gas mixture includes about 15 to 30% $H_2O$. In embodiments, the gas mixture includes about 5% $H_2O$. In embodiments, the gas mixture includes about 10% $H_2O$. In embodiments, the gas mixture includes about 15% $H_2O$. In embodiments, the gas mixture includes about 20% $H_2O$. In embodiments, the gas mixture includes about 25% $H_2O$. In embodiments, the gas mixture includes about 30% $H_2O$. In embodiments, the gas mixture includes about 35% $H_2O$. In embodiments, the gas mixture includes about 40% $H_2O$. In embodiments, the gas mixture includes about 45% $H_2O$. In embodiments, the gas mixture includes about 50% $H_2O$.

In embodiments, tar includes hydrocarbon acids (e.g., formic acid, acetic acid, propionic acid, or butyric acid), sugars (e.g., levoglucosan, glucose, fructose, or cellobiosan), alcohols (e.g., methanol, ethanol, or propanol), aldehydes (e.g., acetaldehyde), ketones (e.g., acetone, 2-cyclopenten-1-one), phenols (e.g., phenol, cresol, xylenol, butylphenol, methylbutylphenol, naphthol, e.g., methylnaphthol), guaiacols (e.g., guaiacol, creosol, ethylguaiacol, eugenol, or isoeugenol), furans (e.g., dimethylfuran, furfural, or dibenzofuran), benzene, toluene, xylene, styrene, indene, methlindene, polycyclic aromatic hydrocarbons (e.g., naphthalene, diphenyl, acenaphthylene, acenaphthene, fluorine, phenanthrene, anthracene, fluoranthene, pyrene, benzo(a)anthracene, chrysene, benzo(b, j, or k)fluoranthene, benzo(a or e)pyrene, dibenzo(a,h)anthracene, perylene, indeno(1,2,3-cd)pyrene, benzo(g,h,i)perylene, dibenzopyrenes, anthanthrene, or coronene), pyridine, picoline, or quinolone. In embodiments, tar includes benzene, toluene, and naphthalene.

In embodiments, the gas mixture includes hydrocarbon acids (e.g., formic acid, acetic acid, propionic acid, or butyric acid), sugars (e.g., levoglucosan, glucose, fructose, or cellobiosan), alcohols (e.g., methanol, ethanol, or propanol), aldehydes (e.g., acetaldehyde), ketones (e.g., acetone, 2-cyclopenten-1-one), phenols (e.g., phenol, cresol, xylenol, butylphenol, methylbutylphenol, naphthol, e.g., methylnaphthol), guaiacols (e.g., guaiacol, creosol, ethylguaiacol, eugenol, or isoeugenol), furans (e.g., dimethylfuran, furfural, or dibenzofuran), benzene, toluene, xylene, styrene, indene, methlindene, polycyclic aromatic hydrocarbons (e.g., naphthalene, diphenyl, acenaphthylene, acenaphthene, fluorine, phenanthrene, anthracene, fluoranthene, pyrene, benzo(a)anthracene, chrysene, benzo(b, j, or k)fluoranthene, benzo(a or e)pyrene, dibenzo(a,h)anthracene, perylene, indeno(1,2,3-cd)pyrene, benzo(g,h,i)perylene, dibenzopyrenes, anthanthrene, or coronene), pyridine, picoline, or quinolone. In embodiments, the gas mixture includes benzene, toluene, and naphthalene.

In embodiments, the level of coke formation is reduced (e.g., reduced by 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%) relative to a control catalyst.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

PROVISIONAL EMBODIMENTS

Embodiment P1

A method of preparing a Ni—Fe—MgO based catalyst, the method comprising: creating a solution by dissolving in a solvent calculated quantities of precursors including $Ni(NO_3)_2.6H_2O$, $Fe(NO_3)_3.9H_2O$, and $Mg(NO_3)_2.6H_2O$; creating a mixture by applying the solution to a substrate; maintaining the mixture at a first temperature for a first duration of time; raising and maintaining temperature of the mixture to a second temperature for a second duration of time, wherein the raising of temperature is performed at a first pre-defined rate of increase; and calcining the mixture by raising and maintaining temperature of the mixture to a third temperature for a third duration of time, wherein the raising of temperature is performed at a second pre-defined rate of increase.

Embodiment P2

The method of preparing a Ni—Fe—MgO of embodiment P1, wherein the solvent comprises water.

Embodiment P3

The method of preparing a Ni—Fe—MgO of embodiment P1, wherein the substrate comprises Carbo HSP.

Embodiment P4

The method of preparing a Ni—Fe—MgO of embodiment P1, wherein the first temperature is between 15° C. to 20° C.

Embodiment P5

The method of preparing a Ni—Fe—MgO of embodiment P1, wherein the first duration of time is between three to six hours.

Embodiment P6

The method of preparing a Ni—Fe—MgO of embodiment P1, wherein the second temperature is about 100° C. to 120° C.

Embodiment P7

The method of preparing a Ni—Fe—MgO of embodiment P1, wherein the first pre-defined rate of increase is 15° C. per minute.

Embodiment P8

The method of preparing a Ni—Fe—MgO of embodiment 1, wherein the second duration of time is between twelve to fifteen hours.

Embodiment P9

The method of preparing a Ni—Fe—MgO of embodiment P1, wherein the third temperature is 850° C.

Embodiment P10

The method of preparing a Ni—Fe—MgO of embodiment P1, wherein the temperature was raised by 50° C. at an interval of 30 minutes with a ramp rate of 15° C. per minute.

Embodiment P11

The method of preparing a Ni—Fe—MgO of embodiment P1, wherein the third duration of time is between twelve to fifteen hours.

Embodiment P12

A method of preparing a Ni—Fe—MgO based catalyst, the method comprising: creating a solution by dissolving in a solvent calculated quantities of precursors $Ni(NO_3)_2.6H_2O$, $Fe(NO_3)_3.9H_2O$, and $Mg(NO_3)_2.6H_2O$; creating a mixture by adding the solution to a substrate; raising and maintaining temperature of the mixture to a first temperature for a first duration of time, wherein the raising of temperature is at a first pre-defined rate of increase; and calcining the mixture by raising and maintaining temperature of the mixture to a second temperature for a second duration of time, wherein the raising of temperature is at a second pre-defined rate of increase.

Embodiment P13

The method of preparing a Ni—Fe—MgO of embodiment P12, wherein the solvent comprises water.

Embodiment P14

The method of preparing a Ni—Fe—MgO of embodiment P12, wherein the substrate comprises $Al_2O_3$.

Embodiment P15

The method of preparing a Ni—Fe—MgO of embodiment P12, wherein the first temperature is about 100° C. to 120° C.

Embodiment P16

The method of preparing a Ni—Fe—MgO of embodiment P12, wherein the first pre-defined rate of increase is 15° C. per minute.

Embodiment P17

The method of preparing a Ni—Fe—MgO of embodiment P12, wherein the first duration of time is between twelve to fifteen hours.

Embodiment P18

The method of preparing a Ni—Fe—MgO of embodiment P12, wherein the second temperature is 600° C.

Embodiment P19

The method of preparing a Ni—Fe—MgO of embodiment P12, wherein the second pre-defined rate of increase is 15° C. per minute.

Embodiment P20

The method of preparing a Ni—Fe—MgO of embodiment P12, wherein the second duration of time is six hours.

Embodiment P21

A Ni—Fe—MgO catalyst, comprising: a calcined mixture of NiO, FeOx, and MgO used as a catalyst at an operating temperature, wherein the calcined mixture comprises Ni to Fe to MgO in a ratio between 10:8:30 by weight and 20:40:40 by weight, wherein the ratio of Ni to Fe and MgO is between 10 and 60, the ratio of Fe to Ni and MgO is between 10 and 40, and the ratio of MgO to Ni and Fe is between 10 and 40, and wherein the operating temperature is between 500° C. and 900° C.

Embodiment P22

The Ni—Fe—MgO catalyst of embodiment P21, further comprising a substrate.

Embodiment P23

The Ni—Fe—MgO catalyst of embodiment P22, wherein the substrate includes Carbo HSP.

Embodiment P24

The Ni—Fe—MgO catalyst of embodiment P21, wherein the operating temperature is 700° C.

ADDITIONAL EMBODIMENTS

Embodiment 1

A catalyst including nickel (Ni), iron (Fe), and magnesium oxide (MgO), wherein the catalyst includes 30 to 60 wt % Ni, 10 to 30 wt % Fe, and 20 to 50 wt % MgO.

Embodiment 2

The catalyst of embodiment 1, wherein the weight ratio is about 40 to 50 wt % Ni, 15 to 25 wt % Fe, and 30 to 40 wt % MgO.

Embodiment 3

The catalyst of embodiment 1, wherein the weight ratio is about 45 wt % Ni, 20 wt % Fe, and 35 wt % MgO.

Embodiment 4

The catalyst of embodiment 1, wherein the catalyst further includes a substrate support.

Embodiment 5

The catalyst of any one of embodiments 1 to 4, wherein the substrate support includes one or more of the ceramic, olivine, dolomite, calcium carbonate, aluminum oxide, silicon dioxide, titanium dioxide, and iron oxide.

Embodiment 6

The catalyst of any one of embodiments 1 to 4, wherein the substrate support includes aluminum oxide, silicon dioxide, titanium dioxide, and iron oxide.

Embodiment 7

The catalyst of any one of embodiments 1 to 6, wherein the catalyst to substrate support weight ratio is 0.5-5.0%.

Embodiment 8

The catalyst of any one of embodiments 1 to 6, wherein the catalyst to substrate support weight ratio is 0.75-1.15%.

Embodiment 9

The catalyst of any one of embodiments 1 to 8, wherein the substrate support is spherical and about 400 to about 600 μm in diameter.

Embodiment 10

The catalyst of any one of embodiments 1 to 9, wherein the catalyst has a honeycomb structure.

Embodiment 11

A method of making a nickel-iron-magnesium oxide catalyst, the method including: (a) mixing nickel nitrate, iron nitrate, and magnesium nitrate in a solvent; (b) combining the solution of step (a) with a substrate support to form a mixture; (c) maintaining the mixture of step (b) at a first temperature $(T_1)$ for a first duration of time $(t_1)$; (d) increasing the temperature of the mixture in step (c) to a second temperature $(T_2)$ and maintaining $T_2$ for a second duration of time $(t_2)$, wherein the increasing of the temperature is performed at a first rate of increase $(R_1)$; and (e) calcining the mixture of step (d) by increasing the temperature of the mixture of step (d) to a third temperature $(T_3)$ and maintaining $T_3$ for a third duration of time $(t_3)$, wherein the increasing of the temperature is performed at a second rate of increase $(R_2)$, wherein $T_1$ is about 15° C. to about 30° C. and $t_1$ is 1 to 12 hours; $T_2$ is about 80° C. to about 120° C. and $t_2$ is 12 to 15 hours; $T_3$ is about 600° C. to about 1000° C. and $t_3$ is 12 to about 15 hours; $R_1$ is about 1° C./minute to about 15° C./minute; and $R_2$ is 50° C./30 minutes to about 100° C./30 minutes; thereby forming the nickel-iron-magnesium oxide catalyst.

Embodiment 12

The method of embodiment 11, wherein $T_1$ is about 15° C. to about 25° C. and $t_1$ is 3 to 6 hours; $T_2$ is about 100° C. to about 120° C. and $t_2$ is 12 to 15 hours; $T_3$ is about 850° C. and $t_3$ is 12 to about 15 hours; $R_1$ is 15° C./minute; and $R_2$ is 50° C./30 minutes.

Embodiment 13

The method of embodiments 11 or 12, wherein the solvent is water.

Embodiment 14

The method of any one of embodiments 11 to 13, wherein the substrate support includes one or more of the ceramic, olivine, dolomite, calcium carbonate, aluminum oxide, silicon dioxide, titanium dioxide, and iron oxide.

Embodiment 15

The method of any one of embodiments 11 to 13, wherein the substrate support includes aluminum oxide, silicon dioxide, titanium dioxide, and iron oxide.

Embodiment 16

The method of any one of embodiments 11 to 15, wherein the substrate support is spherical and about 400 to about 600 μm in diameter.

Embodiment 17

The method of any one of embodiments 11 to 16, wherein the catalyst or catalyst support has honeycomb structure.

Embodiment 18

The method of any one of embodiments 11 to 17, wherein the catalyst to substrate support weight ratio is 0.5-5.0%.

Embodiment 19

The method of any one of embodiments 11 to 17, wherein the catalyst to substrate support weight ratio is 0.75-1.15%.

Embodiment 20

The method of any one of embodiments 11 to 19, further including: (f) maintaining the mixture of step (e) at a first temperature ($T_4$) for a first duration of time ($t_4$) in the presence of hydrogen gas, wherein $T_4$ is 850° C. and $t_4$ is at least one hour.

Embodiment 21

A method of reducing tar from a gas mixture, the method including contacting a catalyst of any one of embodiments 1 to 10 with the gas mixture at an operating temperature from about 500° C. to about 1000° C.

Embodiment 22

The method of embodiment 21, wherein the operating temperature is less than 850° C.

Embodiment 23

The method of embodiment 21, wherein the operating temperature is about 800° C.

Embodiment 24

The method of embodiment 21, wherein the operating temperature is about 700° C.

Embodiment 25

The method of embodiment 21, wherein the operating temperature is about 600° C.

EXAMPLES

Example 1. High Performance Ni—Fe—Mg Catalyst for Tar Removal in Producer Gas A highly active Ni—Fe—Mg material, a promising tar removal catalyst, was prepared and characterized with various techniques: BET, XRD, TPR and SEM. The catalyst was tested for tar decomposition via steam reforming in a laboratory-scale fixed-bed reactor using pre-mixed producer gas containing toluene and ethylene as tar surrogates. The elemental composition of Ni, Fe and MgO was optimized for maximum activity and stability. The optimized catalyst composition contained Ni, Fe, and MgO in the ratio 45:20:35 by weight. The catalyst activity was superior compared to other alkaline earth metal promoters like CaO, SrO, and BaO as well as a Ni—K—MgO reference catalyst in the temperature range between 600 and 800° C. Time on stream with the optimized composition showed unabated tar (toluene+ethylene) conversion of near 100% at 750° C. for at least 48 hrs, indicating no coke formation. The coke formation on Ni was reduced by the formation of a $FeNi_3$ alloy. The enhanced catalyst performance with MgO is attributed to the strong adsorption of $H_2O$ on the oxide ion vacancy site of MgO providing an oxygen exchange site.

The utilization of fossil fuels and the associated impacts has stimulated the development of renewable energy resources, especially from naturally abundant biomass materials. Biomass can be thermo-chemically converted into a producer gas by gasification which can be used in the production of power, fuels, and chemicals through various reactions. The major components in producer gas are: $H_2$, CO, $CO_2$, $H_2O$, $CH_4$, C2-C5 hydrocarbons, tars, $NH_3$, and $H_2S$. The easily condensable tars which include various aromatic hydrocarbons can result in severe fouling and corrosion problems the use of producer gas. A tar free producer gas is required for successful conversion processes into useful products.

Biomass gasification in a dual fluidized-bed (DFB) with steam is a successful method for the production of a nitrogen-free producer gas. Gas cleaning in the downstream processes is important and cost of the processes should be economically viable. Among the removable components, tars can be decomposed by the use of catalyst-coated bed material in a reforming reactor or during gasification itself, with the latter the easiest and least costly method. Non-catalyzed bed materials such as olivine, dolomite, silica sand, and limestone have been used in fluidized bed gasifiers, but these are not sufficiently active to reduce tar content significantly. If the bed material is impregnated with a catalyst, tar content can be significantly reduced during the gasification process. Pure Ni catalysts suffer from coke formation, leading to deactivation of the catalyst as well as sintering of Ni particles at high temperature. Improved Ni-catalyst performance can be obtained by alloying with other metals, or using an oxide promoter in the catalyst formulation. Research on Ni-catalyst formulations using promoter metals such as Cu, Mo, Co, and Fe has been reported. Addition of Fe to Ni has been found beneficial due to formation of an alloy. The role of Fe in contact with Ni is to accumulate the oxygen, by virtue of mild redox capacity, for oxidation of coke species from the metal surface. Therefore, high catalytic performance was observed in Ni—Fe/Mg/Al catalysts due to presence of highly dispersed Ni—Fe alloy particles.

Oxide promoters have been used for Ni and Ni—Fe combinations; however there is no clear trend indicating which oxide promoter brings about certain effects (e.g., an increase in catalytic activity). The addition of a redox component like $CeO_2$ enhanced the activity of Ni as well as Ni—Fe alloys. The oxide vacancy site on $CeO_2$ acting as a $H_2O$ adsorption and desorption center could be responsible for the higher activity. Alkaline earth metal oxide like CaO has been a useful promoter for Ni—Fe, Ni—$Al_2O_3$, or Ni—Fe—$Al_2O_3$ catalysts leading to higher activity for steam reforming reactions. Similarly, Ca-containing Mayenite ($Ca_{12}Al_{14}O_{33}$ or $12CaO.7Al_2O_3$) supported Ni showed good activity and stability. Baidya et al. reported the promotion of Ni—Fe alloy in the presence of CaO (see T. Baidya, R. J. Cattolica, Appl. Catal A: Gen. 503 (2015) 43-50).

The presence of alkaline earth promoters and Fe together can enhance the activity and stability of Ni catalysts. Ni impregnated on natural olivine has improved catalytic activity for tar decomposition. The characterization of Ni/Olivine revealed that Ni can interact with Fe and MgO and enhance the activity. Nakamura et al. reported the promoting effect of MgO in Ni-based catalyst, see K. Nakamura, T. Miyazawa, T. Sakurai, T. Miyao, S. Naito, N. Begum, K. Kunimori, K. Tomishige, Appl. Catal. B: Environ., 86 (2009) 36-44. It showed that MgO helped dispersion of Ni through forming NiO—MgO solid solution. Similarly, Ni/Fe/Mg/Al-containing catalysts showed improved results for toluene reforming as compared to other Ni-based catalysts. Although Ni—Fe alloys have been supported on Mg—Al-oxide mixtures obtained from hydrotalcite composition, the positive role of MgO, along with a Ni-to-Fe ratio in the Ni—Fe alloy, has not been optimized prior to this disclosure. This motivated the development of a catalyst containing the optimum Ni—Fe—MgO composition to utilize the full potential of MgO as a promoter and use in an application as gasifier bed material, all while increasing catalytic activity within a preferred temperature range (e.g., 600-800° C.) while minimizing coke formation.

This disclosure reports a catalyst consisting of a Ni—Fe—MgO mixture with optimization of the components on a support, primarily alumina based support, in order to obtain the highest activity for tar decomposition via steam reforming in producer gas, containing toluene as tar component. The current catalyst formulation comprised of Ni, Fe, and MgO components has been found to have significantly higher toluene conversion activity as well as stability against coke deposition during reforming reaction. Both MgO and Fe played a critical role in overall performance of the Ni-based catalyst. In this study, MgO was found to have exceptionally high promoting effect on the activity of Ni as compared with other alkaline earth metal oxides like CaO, SrO, and BaO oxides. Ni—MgO catalysts had high activity in initially (not shown in this report), but diminished significantly within 1 hr on stream as reflected in collecting data. The black coke formation visible in the catalyst bed was responsible for the decline. The coke formation was significantly diminished by incorporation of Fe into Ni—MgO formulation. In fact, TPO with 1.15% (Ni45Fe20Mg45) composition taken after 48 hrs time-on-stream did not show any signal. The formation of $FeNi_3$ alloy species could be responsible for reducing coke formation ability of Ni metal. As MgO is an irreducible oxide, very little electronic interaction with Ni/Fe metal should occur. Such high activity cannot be due to high dispersion of Ni alone. In fact, MgO lattice contains a high density of oxide ion vacancy on the surface, known for providing adsorption sites for $H_2O$. As hydrocarbon is easily dissociated on Ni surface, it can react with adjacent $H_2O$ molecules on MgO at the interface to form $CO_x$. Therefore, the most probable mechanism on the catalyst surface is as follows:

$$CH_x \rightarrow C+(x/2)H_2$$

$$[V]_{MgO}+H_2O \rightarrow H_2O^*$$

$$C+H_2O^* \rightarrow CO+H_2+[V]_{MgO}$$

Where $[V]_{MgO}$ is the oxygen vacancy site.

MgO was found much superior as a promoter for Ni—Fe metals combination as compared to other alkaline earth metal oxides like CaO, SrO, and BaO. The Ni—Fe—Mg oxide mixture impregnated on CARBO HSP contains an optimized composition of Ni, Fe, and MgO in the % wt. ratio of 45:20:35 as represented by 1.15% (Ni45Fe20Mg35)/ Carbo HSP. This composition demonstrated the highest activity for reforming of toluene in the producer gas as compared with a reference catalyst. Further, it showed unprecedented toluene conversion of nearly 100% for at least 48 hrs, and there was no visible coke deposition leading to deactivation of the catalyst. TPR of the as-prepared Ni—Fe—Mg catalysts indicate strong interaction between Ni, Fe, and Mg in the oxide form, which may be responsible for shifting the reduction to higher temperature and formation of smaller Ni—Fe metal particles as compared to catalysts without MgO. The reduced phase of the catalyst contain $FeNi_3$ alloy phase and seemed to be responsible for coke resistance of the catalyst. The reason for high rate of toluene conversion over this catalyst is most probably due to the high rate of $H_2O$ adsorption which react with carbon species generated by C—C bond breaking on the Ni surface. The high concentration of defect sites in MgO is considered as active sites for $H_2O$ adsorption, helping removal of coke species from Ni surface at a faster rate, leading to high activity of the catalyst.

Example 2. Catalyst Preparation and Characterization

Ni, Fe, Ni—MgO, and Ni—Fe—CaO mixed oxides catalysts were prepared using a gasifier bed material support (Carbo HSP) by wet-impregnation method. The elemental composition of the commercial support material was: 83% $Al_2O_3$ 7% $Fe_2O_3$, 5.0% $SiO_2$, 3.5% $TiO_2$, and 1.5% others. The components of the impregnated Ni—Fe—MgO catalysts were varied with the goal of obtaining the highest catalytic activity while minimizing the negative qualities (e.g., coke formation). Stoichiometric amounts of precursor salts including $Ni(NO_3)_2.6H_2O$, $Fe(NO_3)_3.9H_2O$, and $Mg(NO_3)_2.6H_2O$ were dissolved in minimum volume of water to a transparent solution and then 20 g of pre-calcined Carbo HSP support was mixed into the solution with continuous stirring until the whole surface was just wet. Thereafter, the support impregnated with catalyst precursor solution was left for 6 h at room temperature and then transferred to a furnace at 110° C. for 12 hrs. The temperature was increased by an interval of 50 degree with 15 min dwelling at each point up to 850° C. and then left at this temperature for 12 hrs. The metal salts were decomposed at high temperature to the corresponding oxides giving NiO, $FeO_x$, and MgO mixtures. Total loading on a metals/metal-oxide basis was between 0.75 and 1.15% by weight, considering reducible oxides (NiO and $FeO_x$) in metal form (As catalysts were pretreated in $H_2$). Table 1 shows the list of catalysts with calculated weights of Ni, Fe, and MgO components taken during preparation.

TABLE 1

| Catalyst on Carbo HSP | Catalyst Batch Prepared (g) | Amount Ni (g) | Amount Fe (g) | Amount MgO (g) | Ni:Fe:MgO ratio (%) |
|---|---|---|---|---|---|
| Theoretical calculation of catalyst loading on Carbo HSP support. | | | | | |
| 0.75% Ni | 20 | 0.15 | 0.0 | 0.0 | — |
| 0.75% Fe | 20 | 0.0 | 0.15 | 0.0 | — |
| Variation of MgO with fixed 1% Ni | | | | | |
| 0.2% MgO + 1% Ni | 20 | 0.2 | 0 | 0.04 | 83:0:17 |
| 0.3% MgO + 1% Ni | 20 | 0.2 | 0 | 0.06 | 77:0:23 |
| 0.4% MgO + 1% Ni | 20 | 0.2 | 0 | 0.08 | 71:0:29 |
| 0.5% MgO + 1% Ni | 20 | 0.2 | 0 | 0.10 | 67:0:33 |
| Ni to Fe ratio variation with fixed 0.4% MgO | | | | | |
| 0.4% MgO + 0.75% Ni+ | 20 | 0.209 | 0.0 | 0.08 | 72:0:28 |
| 0.4% MgO + 0.75% (Ni90Fe10) | 20 | 0.167 | 0.02 | 0.08 | 62:8:30 |
| 0.4% MgO + 0.75% (Ni75Fe25) | 20 | 0.125 | 0.04 | 0.08 | 51:16:33 |
| 0.4% MgO + 0.75% (Ni67Fe33) | 20 | 0.102 | 0.05 | 0.08 | 44:22:34 |
| 0.4% MgO + 0.75% (Ni60Fe40) | 20 | 0.084 | 0.06 | 0.08 | 37:27:36 |
| 0.4% MgO + 0.75% (Ni35Fe65) | 20 | 0.041 | 0.08 | 0.08 | 20:40:40 |
| MgO loading with fixed 0.75% (Ni67Fe33) | | | | | |
| 0.1% MgO + 0.75% (Ni67Fe33) | 20 | 0.105 | 0.05 | 0.02 | 60:29:11 |
| 0.2% MgO + 0.75% (Ni67Fe33) | 20 | 0.105 | 0.05 | 0.04 | 53:26:21 |
| 0.3% MgO + 0.75% (Ni67Fe33) | 20 | 0.105 | 0.05 | 0.06 | 49:23:28 |
| 0.4% MgO + 0.75% (Ni67Fe33) | 20 | 0.105 | 0.05 | 0.08 | 45:20:35 |
| 0.5% MgO + 0.75% (Ni67Fe33) | 20 | 0.105 | 0.05 | 0.10 | 41:20:39 |

The nomenclature of 0.75% (Ni67Fe33) indicates a Ni:Fe ratio of 67:33 by weight with a total loading of 0.75%. Similarly, in 1.15% (Ni45Fe20Mg35), the Ni:Fe:MgO ratio was 45:20:35 by weight with a total loading of 1.15%. For comparison, CaO, SrO, and BaO containing samples were also prepared. In these oxides, CaO, SrO, and BaO were loaded in an equivalent molar quantity of 0.4 wt % MgO. The common support Carbo HSP is not mentioned in the catalyst formulation in the next sections. For comparison, a formulation corresponding to the NREL 60 catalyst, using 1.15% (Ni41Mg27K32), was considered as a reference catalyst for this study. The reference catalyst was prepared following the procedure mentioned in the literature, see for example K. A. Magrini-Bair, W. S. Jablonski, Y. O. Parent, M. M. Yung, Top. Catal. 55 (2012) 209-217. This catalyst contained Ni:MgO:$K_2O$ ratio of 41:27:32. (Since Mg and K always remain in oxide form, their weight has been calculated in oxide form in this study.)

Nitrogen physisorption and surface area were measured with a Micrometrics ASAP 2020 Instruments at 77 K. The samples were outgassed for 1 h under vacuum at 400° C. before the measurements, and the specific surface area (SSA) was determined using the Brunauer-Emmett-Teller (BET) method.

X-ray diffraction (XRD) was measured in an X-ray diffractometer (BRUKER D2 PHASER) equipped with a monochromator for Cu Kα radiation at a voltage of 30 kV, and a current of 100 mA. The impregnated catalysts were measured from 2θ=20 to 600 with a step size of 0.02°. The XRD data was analyzed using the International Centre for Diffraction Data (ICDD) database.

Temperature-programmed reduction (TPR) studies were performed in a Quantachrome Instrument (ChemBET-3000 TPR/TPD). For this experiment, 500 mg of the catalyst was loaded into a U-shaped quartz tube reactor. Before the TPR experiment, the sample was outgassed under $N_2$ flow at 400° C. for 1 h and allowed to cool down to room temperature. Then, the reactor temperature was ramped from 40 to 800° C. at 10° C./min under 3% $H_2/N_2$. The amount of reduction was monitored by a thermal conductivity detector (TCD).

The scanning electron microscopic study was carried out in Phillips XL30 machine to look into the microstructures in the surface.

The transmission electron microscopy was carried out in FEI Tecnai Sphera instrument. For this purpose, powder Ni—Fe—MgO catalysts were taken out of the Carbo HSP support by scratching it with butter paper, and then the powder was loaded on a Cu grid. The imaging was carried out at 200 kV.

Catalytic Test.

The catalytic steam reforming reactions were carried out in a fixed-bed reactor setup described in a previous study, A. Bambal, K. S. Vacchio, R. J. Cattolica, Ind. Eng. Chem. Res. 53 (2014) 13656-13666. In this work, 2.0 g of catalyst was mixed with quartz chips (1/16") with a ratio of 1:10 (by wt.). The mass transfer limitation is expected to remain negligible considering the non-porous nature of the catalyst support. The catalysts were activated by reducing the metal oxides in $H_2$ flow at 850° C. for 1 hr in the reactor, raising the bed temperature with a ramp rate of 10° C. $min^{-1}$. Then, the reactor was cooled down in $N_2$ flow to below 800° C. The steam reforming was carried out between 650° C. and 800° C., and the total flow rate of 433 sccm was maintained including $H_2O$ in gaseous state referenced to STP (0° C., 1 bar).

The process of regeneration of used catalyst was done by the following steps: (1) re-oxidation in pure $O_2$ for 1 hr at 800° C., (2) purged with $N_2$, and then (3) reduced again in $H_2$ for 1 hr at 800° C. This composition of feed-gas was similar to that of producer gas from biomass gasification, S. Phillips, A. Aden, J. Jechura, D. Dayton, T. Eggeman, Technical Report, U.S. National Renewal Energy Laboratory, NREL/TP-510-41168, April 2007. The producer gas composition (mol %) used was: 13.4% H2, 25.3% CO, 6.4% $CO_2$, 9.8% $CH_4$, 3.9% $C_2H_4$, 40.4% $H_2O$ and 0.9% $C_7H_8$. In this study, the producer gas mixture was diluted with $N_2$ giving a final composition as: 10.6% $H_2$, 19.9% CO, 5.23% $CO_2$, 7.8% $CH_4$, 3.17% $C_2H_4$, 31.7% $H_2O$, 0.74% $C_7H_8$ and 21.7% $N_2$. The $C_7H_8$ content in the gas mixture was 35.7 g $Nm^{-3}$, similar to the content reported in the producer gas obtained in fluidized-bed gasification. The outlet gas compositions were analyzed by micro-gas-chromatography and the volume corrections were made with $N_2$ reference. The conversion of any reacting component is determined by the following expression:

The percent conversion for a reactant A, i.e., %, is calculated by:

$$X_A(\%) = \left[ \frac{mol_A^{in} - mol_A^{out}}{mol_A^{in}} \right] \times 100$$

BET Surface Area:

Although BET surface area was measured in a sensitive instrument for all catalysts, it did not produce significant results. Pure Carbo HSP did not show any positive value after several attempts, and only 1.15% (Ni45Fe20Mg35)/Carbo HSP catalyst produced a value of 0.03 $m^2$/g. However, the same instrument was tested with γ-Alumina sample measuring SA as low as 0.6 $m^2$/g. Therefore, surface area was extremely low in the about 400 micron-sized spherical support and catalysts.

Figure 8:
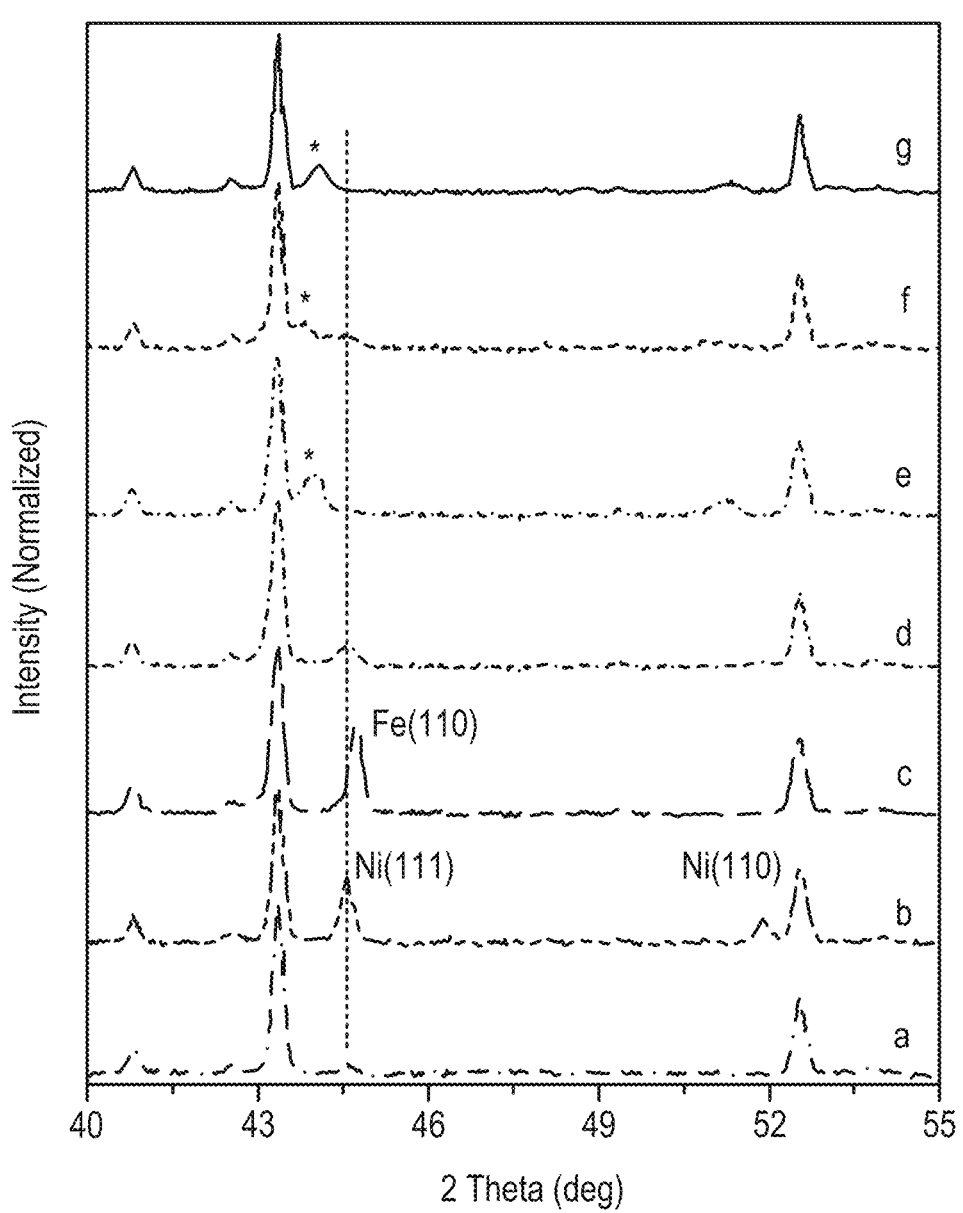
FIG. 8. XRD patterns of (a) Carbo HSP, (b) 0.75% Ni, (c) 0.75% (Fe67Mg33), (d) 1.15% (Ni67Mg33), (e) 0.75% (Fe67Fe33), (f) Fresh 1.15% (Fe45Fe20Mg35) and (g) Spent 1.15% (Ni45Fe20Mg35); * indicates Ni—Fe alloy peak.

As observed in FIG. 8, XRD profiles are presented of pure Carbo HSP support as well as 0.75% Ni, 1.15% (Fe67Mg33), 1.15% (Ni67Mg33), 1.15% (Ni67Fe33) and 1.15% (Ni45Fe20Mg35) (both fresh and used) impregnated Carbo HSP catalysts. As catalytic studies were carried out after reducing the oxide components with hydrogen, the XRD samples were also ex-situ reduced before the measurements. Probable phases related to metals like Ni, Fe, NiFe alloy or Mg oxide were analyzed with respect to reduced Carbo HSP as background, see FIG. 8 line a. The maximum intense peaks at 44.6° and 51.9° correspond to (111) and (110) planes of Ni metal on Carbo HSP surface, see FIG. 8 line b. Upon addition of MgO into 0.75% Ni/Carbo HSP and 0.75% Fe/Carbo HSP, not shown in FIG. 8, the observed intensities from Ni and Fe metals were different despite having similar amount of metal loading. Fe metal detected at 44.82° for (110) plane in Fe/Carbo remained almost similar to that in 1.15% (Fe67Mg33), see FIG. 8 line c. The intensity of Ni (111) was significantly reduced in the 1.15% (Ni67Mg33) catalyst, see FIG. 8 line d as compared with pure Ni loading, see FIG. 8 line b. By comparing main peak intensity of 075% Ni/Carbo catalyst (containing similar amount of Ni), it was found that 58% of the NiO could be reduced while the remaining 42% was in the form of a solid solution with MgO. The mixture of Fe and Ni in 1.15% (Ni67Fe33) led to formation of a new phase, in which peak position shifted to lower 2θ at 44° (marked by * in FIG. 8 line e) and the absence of pure Ni or Fe peaks indicate formation of Ni—Fe alloys in their mixture. The new peak in freshly reduced 1.15% (Ni45Fe20Mg35) sample, FIG. 8 line f, was positioned at 43.8° and was broad in nature. The small broad signal toward higher angle indicates presence of some pure Ni and Fe particles also. However, a distinct peak at 44° in the used catalyst with enhanced intensity was observed, FIG. 8 line g. The signals with the maximum intense peaks at 44.1 ((221) plane in Pm-3m lattice) and 43.8° were characterized as FeNi₃ (PDF 00-063-3244) and FeNi (PDF 01-071-8321) alloy phases, respectively. As a FeNi₃ phase was partly formed in freshly reduced 1.15% (Ni45Fe20Mg35) catalyst along with a small amount of Ni and Fe metals as separate phases, the broad overlapping peaks do not allow the quantification of alloy formed in the pretreatment process. However, more FeNi₃ phase and larger particle formation (narrower peak) was formed at high temperatures during time on stream, giving higher intensity in the used catalyst. By comparing the intensity of FeNi₃ alloy in 1.15% (Ni45Fe20Mg35), it was only 42% in 0.75% (Ni67Fe33), which contains the same amount of Ni. This means that significant amount of Ni may be interacting with MgO by forming $Mg_{1-x}Ni_xO_2$ solid solution. The MgO phase, however, was not detected by XRD, indicating high dispersion or absence of crystallinity.

TPR Analysis.

Figure 9:
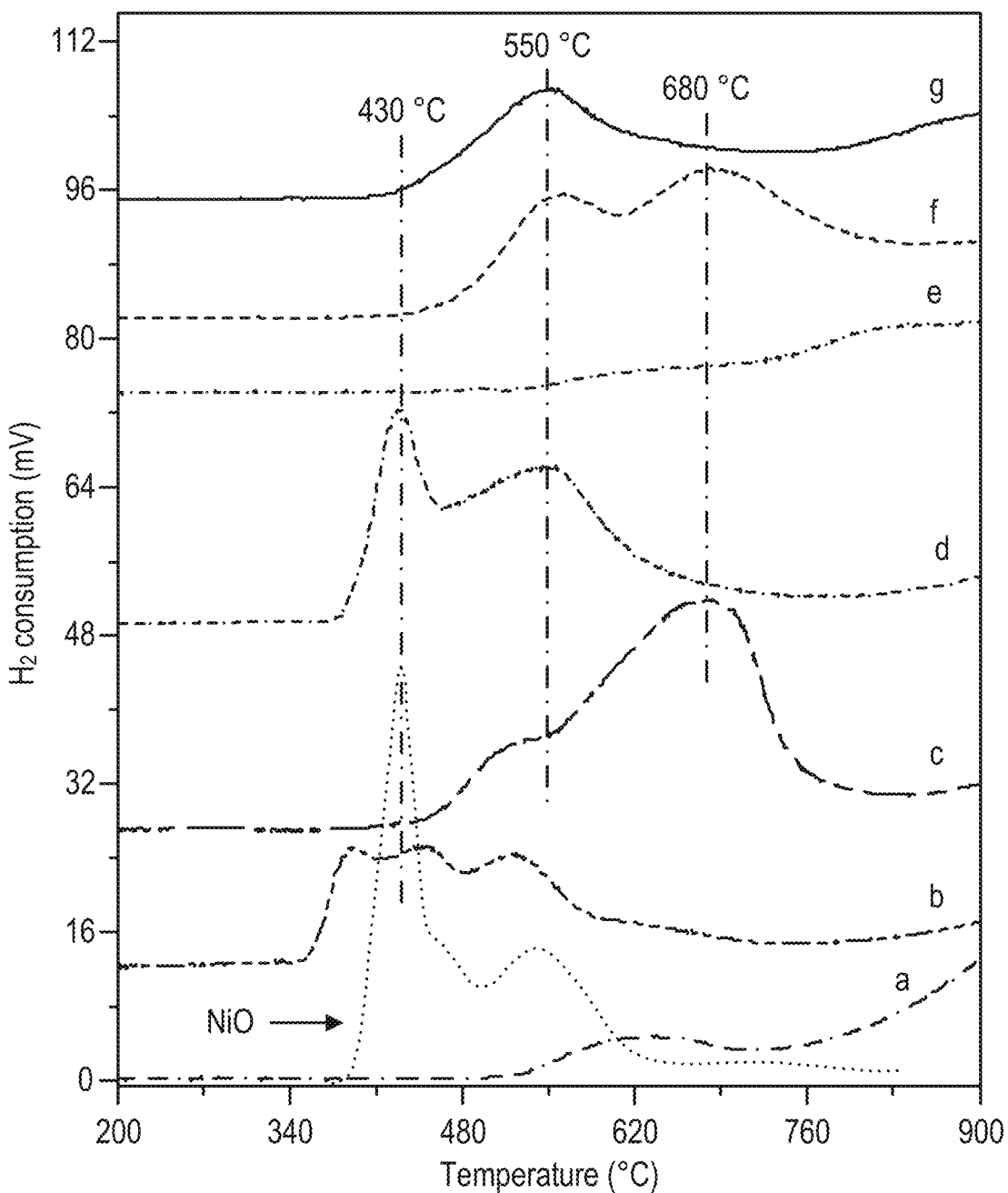
FIG. 9. TPR profiles of (a) Carbo HSP, (b) 0.75% Ni, (c) 0.75% Fe, (d) 1.15% (Ni67Fe33), (e) 1.15% (Ni67Mg33), (f) 1.15% (Fe67Mg33) and (g) 1.15% (Ni45Fe20Mg35) impregnated catalysts.
Figure 11A:
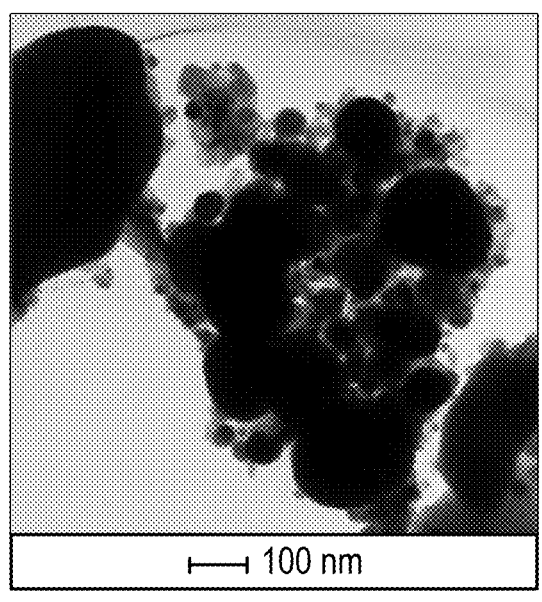
FIGS. 11A-11D: illustrates the TEM images of freshly reduced samples of (FIG. 11A) 0.75% Ni, (FIG. 11B) 1.15% (Ni67Fe33), (FIG. 11C) 1.15% (Ni45Fe20Mg35), and (FIG. 11D) spent 1.15% (Ni45Fe20Mg35).
Figure 11B:
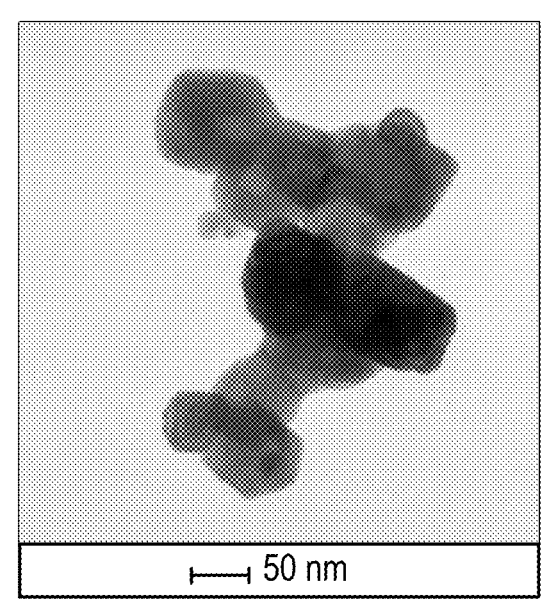
Figure 11C:
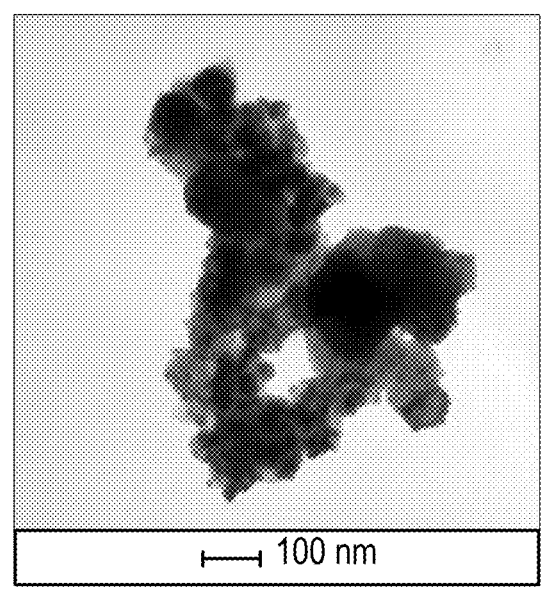
Figure 11D:
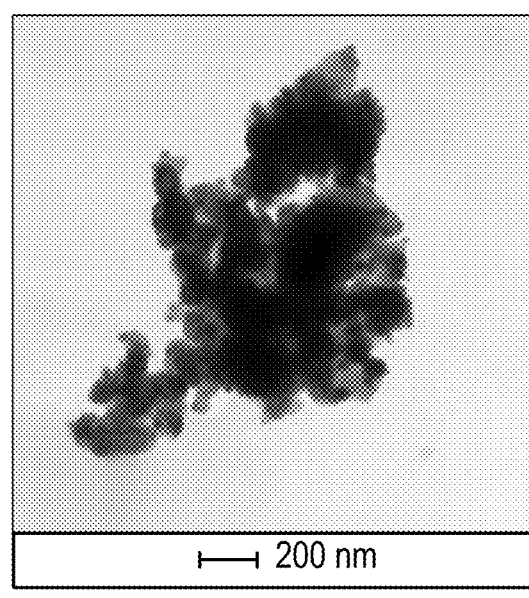
Figure 12A:
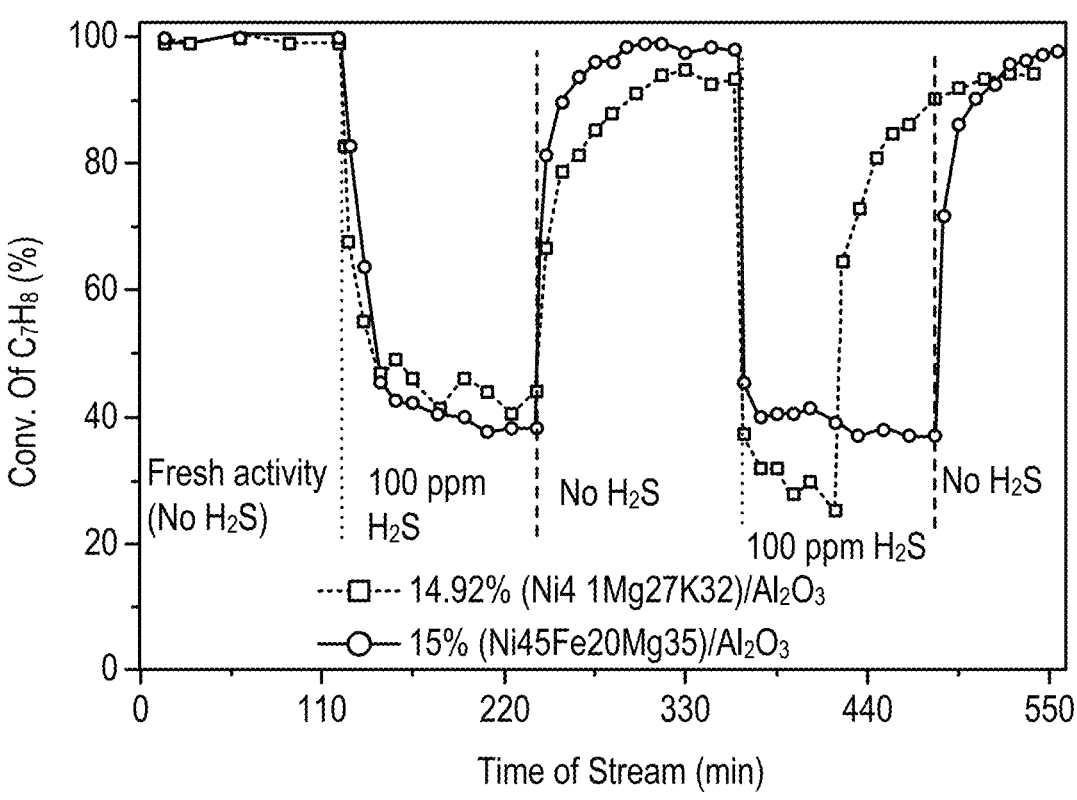
FIGS. 12A-12B.
Figure 12B:
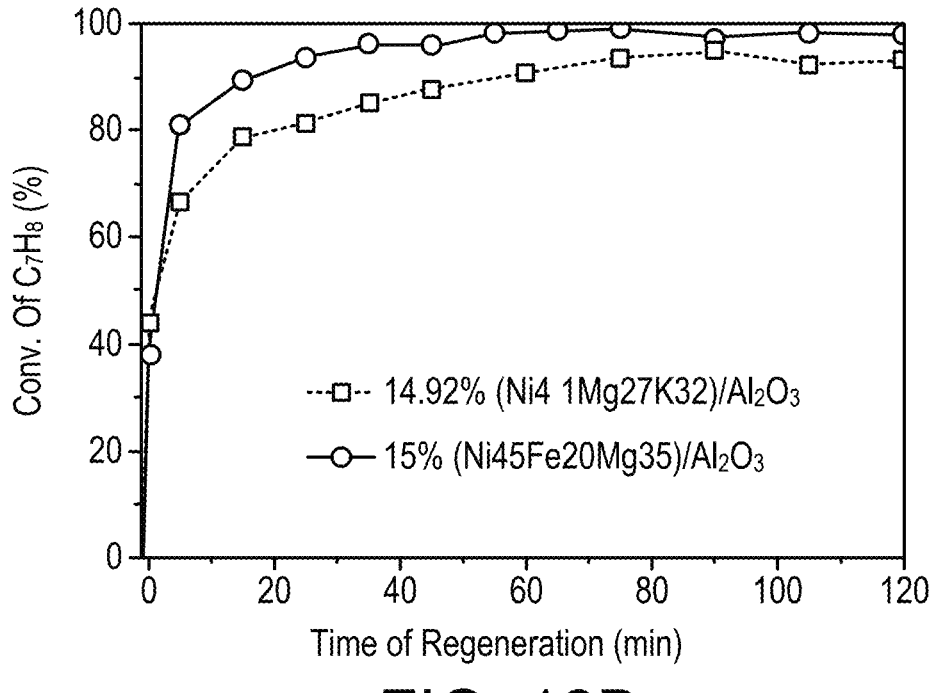

In FIG. 9, Temperature Programmed Reduction (TPR) profiles of pure Carbo HSP support as well as 0.75% Ni, 0.75% Fe, 0.75% (Ni67Fe33), 1.15% (Ni67Mg33), 1.15% (Fe67Mg33), and 1.15% (Ni45Fe20Mg35) impregnated Carbo HSP catalysts are presented. As a reference, the pure NiO profile (dotted line) was also incorporated in the figure. The surface reduction in unanalyzed Carbo HSP produces a small peak at 625° C. and then bulk reduction starts occurring above 735° C., see FIG. 9 line a. Total reduction of the reducible oxides in the support up to 850° C. corresponds to 272 μmol $H_2$ $g_{cat}^{-1}$. By addition of Ni, Fe or Ni—Fe onto Carbo HSP support, reduction occurred at lower temperatures. While NiO impregnated catalyst (FIG. 9, line b)) was reduced in the temperature range between 350° C. and 600° C., the same with FeO$_x$ (FIG. 9, line c) occurred between 450° C. and 770° C. On the other hand, two reduction peaks in 0.75% (Ni67Fe33) catalyst, FIG. 9 line d, at 430° C. and 550° C. indicate separate reductions in NiO and FeO$_x$ species, respectively. It also indicates that presence of NiO decreased the temperature of FeO$_x$ reduction to 550° C. in 0.75% (Ni67Fe33), from 680° C. in 0.75% Fe catalyst (see FIG. 9 lines c and d). Total reductions were increased to the equivalent of 620, 860 and 780 μmol $H_2$ $g_{cat}^{-1}$ in Ni, Fe and Ni—Fe impregnated catalysts, respectively. Thus, total reductions were higher than expected from total reduction of impregnated metal oxides plus support, indicating significant reduction of the support in presence of Ni, Fe or Ni—Fe. With MgO addition along with Ni, Fe and Ni—Fe on Carbo HSP, the reduction of impregnated metal oxides became difficult, especially in Ni containing catalysts, shifting toward higher temperatures. Thus, total reductions were found to be 240, 800 and 540 μmol $H_2$ $g_{cat}^{-1}$ in Ni—Mg, Fe—Mg and Ni—Fe—Mg impregnated catalysts, respectively. By subtracting the support reduction in fresh Carbo HSP, it was found that 56% NiO was reduced in 1.15% (Ni67Mg33) as compared to that in 0.75% Ni/Carbo catalyst. Similarly, 47% reduction was observed in 1.15% (Ni45Fe20Mg35) as compared to 0.75% (Ni67Fe33) catalyst. The lower extent of reduction of NiO in presence of MgO was quite similar to the earlier studies. The formation of $Mg_{1-x}Ni_xO$ solid solution was held responsible for lower extent of reduction due to strong interaction and therefore, full reduction of NiO was not achieved below 900° C. On the contrary, FeO$_x$ reduction in Fe—Mg/Carbo remained unaffected and therefore, total reduction of FeO$_x$ was nearly 100% as compared with Fe/Carbo HSP. This is because FeO$_x$ cannot form solid solution with NiO. The slow reduction of NiO in Ni—Fe—MgO catalyst could form small Ni particles with high dispersion after reduction pretreatment. This was apparent from the XRD profiles of the respective catalysts which showed small intensity with broad peaks.

SEM Analysis.

In FIGS. 10A-10D, SEM images of freshly reduced samples of 0.75% Ni, 1.15% (Ni67Fe33), and 1.15% (Ni45Fe20Mg35 (both fresh and spent) catalysts are presented. The images also reveal that particles are agglomerated making larger assemblies with different shapes on Carbo HSP surface. FIG. 10A and FIG. 10B show that both, pure Ni and Ni—Fe particles were agglomerated into large assemblies in 0.75% Ni and 1.15% (Ni67Fe33) catalysts. On the other hand, surface morphologies in the MgO containing catalysts indicate presence of small particles. Therefore, Ni—Fe is highly dispersed as MgO promotes formation of small particles. The surface morphology did not change much in the spent catalyst (FIG. 10D) as compared to freshly reduced sample (FIG. 10C). Coke deposition is a common problem in Ni catalysts. There was no coke deposition in the catalyst as was visible in the earlier study, T. Baidya, R. J. Cattolica, Appl. Catal A: Gen. 498 (2015) 150-158. Therefore, MgO helps to keep Ni and Ni—Fe particles well dispersed under at high temperature as well as stop coke formation on catalyst surface.

TEM Analysis.

In FIG. 11, TEM images of the freshly reduced samples of 0.75% Ni, 1.15% (Ni67Fe33) and 1.15% (Ni45Fe20Mg35) (Spent catalyst too) are presented. The TEM images did not provide information on the characterization because catalysts were pre-calcined and then reduced at high temperature (850° C.), so lattice fringes were not visible in the large metal particles formed in such harsh treatments. However, crystallite size was determined with some assumption here. It was assumed that in the 0.75% Ni sample (FIG. 11A), nickel crystallite sizes distribution ranged from 50 nm to more than 200 nm as detected by dark particles. The small particles of less than 20 nm seem to be MgO crystallite. In presence of Fe in 1.15% (Ni67Fe33) (FIG. 11B), the Ni particle size become smaller comparatively which remains in the 50 to 100 nm range. It was not possible to detect Fe or Ni particles separately. FIG. 11C and FIG. 11D shows freshly reduced and spent sample of 1.15% (Ni45Fe20Mg35) respectively. It is assumed that the small crystallites are of MgO and these particles are well distributed on the comparative large particle of Ni—Fe crystallites beneath. The images show almost similar particle size distribution indicating good stability of the catalyst.

Example 3. Ni—Fe-MGO Catalyst on an Alternative Support

The Ni—Fe—MgO mixed oxides catalyst with Ni:Fe:MgO ratio of 45:20:35 was impregnated in the cylindrical cordierite honeycomb structure by dipping and drying method. The as-purchased honeycombs were at first calcined in air at 800° C. for 36 hrs. Then, calcined honeycomb was coated with $SiO_2$ using a solution of colloidal silica and again calcined in air by raising the temperature an interval of 50 degree with 15 min dwelling at each point up to 800° C. and then left at this temperature for 15 hrs. This led to $SiO_2$ loading of approximately 6.5% by weight in the honeycomb. Now, the honeycombs were ready for catalyst loading on top of silica layer. For this, a transparent solution was prepared by dissolving 10.4 g of $Ni(NO_3)_2.6H_2O$, 7.2 g of $Fe(NO_3)_3.9H_2O$, and 10.71 g of $Mg(NO_3)_2.6H_2O$ (5% in excess) in 50 ml of $H_2O$. The honeycomb was dipped in the solution for few minutes, shaken to remove excess solution blocking the pores and dried in hot air using a drier. The catalyst coated honeycombs were then transferred to a furnace at 110° C. for 12 hrs. The temperature was increased by an interval of 50 degree with 15 min dwelling at each point up to 800° C. and then left at this temperature for 15 hrs. The variation in catalyst loading was achieved by number of dipping and drying as well as changing the salt concentrations.

Cordierite, a light-blue to dark blue or gray orthorhombic mineral, is a silicate of magnesium, aluminum, and sometimes iron, and is found in granites and in metamorphic rocks that form under relatively low-pressure conditions. Chemical formula: (Mg,Fe) 2 Al 4 Si 5 O 18.

Figure 13:
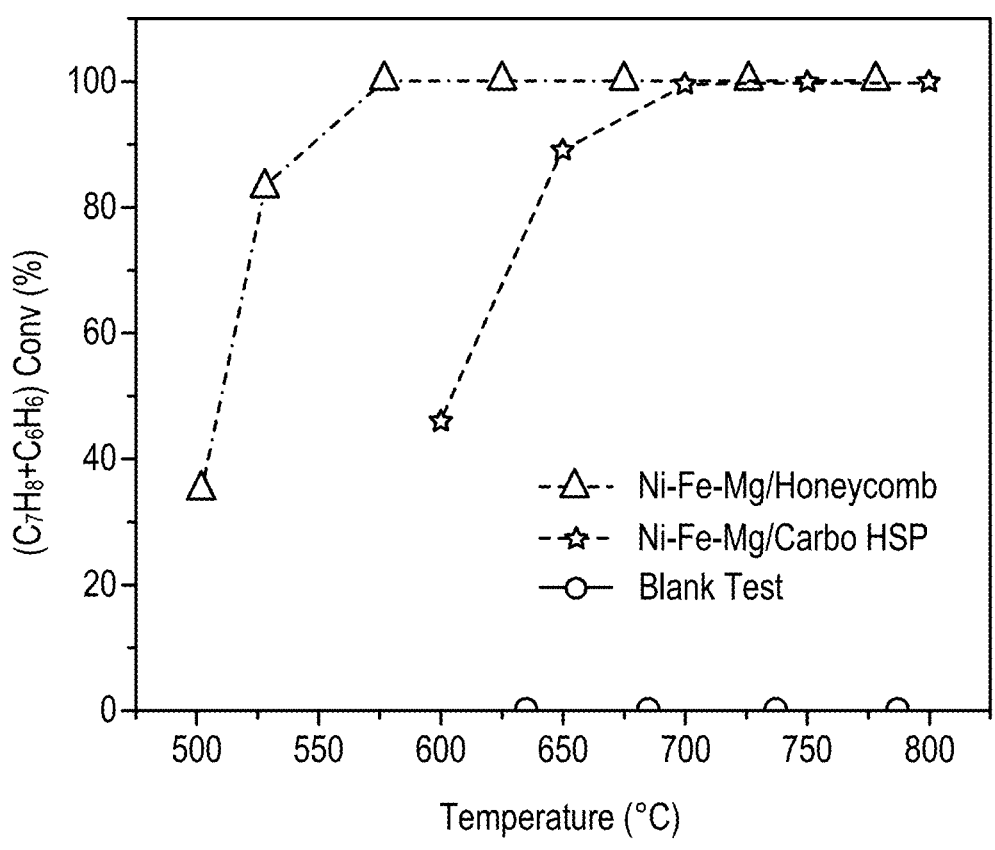
FIG. 13. Flow reactor results on simulated producer gas showing lowered minimum temperature for 100% Tar reforming in Ceramic honeycomb compared with Carbo HSP 400 micron bed material from 700° C. to 575° C.

As seen in FIG. 13, flow reactor results on simulated producer gas showing lowered minimum temperature for 100% tar reforming in Ceramic honeycomb compared with Carbo HSP 400 micron bed material from 700° C. to 575° C.

What is claimed is:

1. A catalyst comprising an active catalyst component including nickel (Ni), iron (Fe), and magnesium oxide (MgO), wherein the active catalyst component comprises from about 40 to about 50 wt % Ni, from about 15 to about 25 wt % Fe, and from about 30 to about 40 wt % MgO.

2. The catalyst of claim 1, wherein the active catalyst component comprises about 45 wt % Ni, about 20 wt % Fe, and about 35 wt % MgO.

3. The catalyst of claim 1, wherein the catalyst further comprises a substrate support.

4. The catalyst of claim 3, wherein the substrate support comprises one or more of ceramic, olivine, dolomite, calcium carbonate, aluminum oxide, silicon dioxide, titanium dioxide, and iron oxide.

5. The catalyst of claim 3, wherein the substrate support comprises aluminum oxide, silicon dioxide, titanium dioxide, and iron oxide.

6. The catalyst of claim 3, wherein the active catalyst component to substrate support weight ratio is 0.5-5.0%.

7. The catalyst of claim 1, wherein the weight ratio of Ni to the total weight of Ni and Fe in the active catalyst component is less than 0.7.

8. The catalyst of claim 1, wherein the weight ratio of Ni to the total weight of Ni and Fe in the active catalyst component is about 0.65.

9. The catalyst of claim 1, wherein the weight ratio of MgO to the total weight of Ni and Fe in the active catalyst component is less than 0.6.

10. The catalyst of claim 1, wherein the weight ratio of MgO to the total weight of Ni and Fe in the active catalyst component is about 0.5.

11. The catalyst of claim 1, wherein the weight ratio of MgO to the total weight of Ni and Fe in the active catalyst component is less than 0.6 and the weight ratio of Ni to the total weight of Ni and Fe in the active catalyst component is less than 0.7.

12. The catalyst of claim 1, wherein the weight ratio of MgO to the total weight of Ni and Fe in the active catalyst component is about 0.5 and the weight ratio of Ni to the total weight of Ni and Fe in the active catalyst component is about 0.65.

13. A method of making a catalyst comprising a substrate support and an active catalyst component including nickel (Ni), iron (Fe), and magnesium oxide (MgO), wherein the active catalyst component comprises from about 40 to about 50 wt % Ni, from about 15 to about 25 wt % Fe, and from about 30 to about 40 wt % MgO, said method comprising:

(a) mixing nickel nitrate, iron nitrate, and magnesium nitrate in a solvent;

(b) combining the solution of step (a) with a substrate support to form a mixture;

(c) maintaining the mixture of step (b) at a first temperature ($T_1$) for a first duration of time ($t_1$);

(d) increasing the temperature of the mixture in step (c) to a second temperature ($T_2$) and maintaining $T_2$ for a second duration of time ($t_2$), wherein the increasing of the temperature is performed at a first rate of increase ($R_1$); and (e) calcining the mixture of step (d) by increasing the temperature of the mixture of step (d) to a third temperature ($T_3$) and maintaining $T_3$ for a third duration of time ($t_3$), wherein the increasing of the temperature is performed at a second rate of increase ($R_2$), wherein $T_1$ is about 15° C. to about 30° C. and $t_1$ is 1 to 12 hours;

$T_2$ is about 80° C. to about 120° C. and $t_2$ is 12 to 15 hours;

$T_3$ is about 600° C. to about 1000° C. and $t_3$ is 12 to about 15 hours;

$R_1$ is about 1° C./minute to about 15° C./minute; and $R_2$ is 50° C./30 minutes to about 100° C./30 minutes;

thereby forming a nickel-iron-magnesium oxide catalyst comprising a substrate support and an active catalyst component, wherein the active catalyst component comprises from about 40 to 50 wt % Ni, from about 15 to 25 wt % Fe, and from about 30 to 40 wt % MgO.

14. The method of claim 13, wherein $T_1$ is about 15° C. to about 25°° C. and $t_1$ is 3 to 6 hours;

$T_2$ is about 100° C. to about 120° C. and $t_2$ is 12 to 15 hours;

$T_3$ is about 850° C. and $t_3$ is 12 to about 15 hours;

$R_1$ is 15° C./minute; and $R_2$ is 50° C./30 minutes.

15. The method of claim 13, wherein the solvent is water.

16. The method of claim 13, wherein the substrate support comprises one or more of ceramic, olivine, dolomite, calcium carbonate, aluminum oxide, silicon dioxide, titanium dioxide, and iron oxide.

17. The method of claim 13, wherein the substrate support comprises aluminum oxide, silicon dioxide, titanium dioxide, and iron oxide.

18. The method of claim 13, wherein the substrate support is spherical and about 400 to about 600 μm in diameter.

19. The method of claim 13, wherein the catalyst has a honeycomb structure.

20. The method of claim 13, wherein the catalyst to substrate support weight ratio is 0.5-5.0%.

21. The method of claim 13, further comprising:

(f) maintaining the mixture of step (e) at a first temperature ($T_4$) for a first duration of time ($t_4$) in the presence of hydrogen gas, wherein $T_4$ is 850° C. and $t_4$ is at least one hour.

22. A method of reducing tar from a gas mixture, the method comprising contacting a catalyst of claim 1 with the gas mixture at an operating temperature from about 500° C. to about 1000° C.

23. The method of claim 22, wherein the operating temperature is less than 850° C.

* * * * *